United States Patent
Olsen et al.

(10) Patent No.: US 11,787,953 B2
(45) Date of Patent: Oct. 17, 2023

(54) POLYSILOXANE-BASED FOULING CONTROL COATING SYSTEMS

(71) Applicant: HEMPEL A/S, Kgs. Lyngby (DK)

(72) Inventors: Stefan Møller Olsen, Virum (DK); Dorte Hillerup Hansen, Virum (DK); Anders Blom, Espergærde (DK)

(73) Assignee: HEMPEL A/S, Kgs. Lyngby (DK)

( * ) Notice: Subject to any disclaimer, the term of this patent is extended or adjusted under 35 U.S.C. 154(b) by 55 days.

(21) Appl. No.: 17/193,528

(22) Filed: Mar. 5, 2021

(65) Prior Publication Data

US 2021/0261793 A1    Aug. 26, 2021

Related U.S. Application Data

(63) Continuation of application No. 14/775,375, filed as application No. PCT/DK2014/050068 on Mar. 20, 2014, now abandoned.

(30) Foreign Application Priority Data

Mar. 20, 2013  (EP) .................................. 13160169

(51) Int. Cl.
  *C09D 183/04*  (2006.01)
  *C09D 5/16*  (2006.01)

(52) U.S. Cl.
  CPC .......... *C09D 5/1675* (2013.01); *C09D 5/1693* (2013.01); *Y10T 428/31663* (2015.04)

(58) Field of Classification Search
  CPC ....... B05D 7/52; C09D 5/1675; C09D 5/1693
  See application file for complete search history.

(56) References Cited

U.S. PATENT DOCUMENTS

| | | | |
|---|---|---|---|
| 7,377,968 B2 | 5/2008 | Reybuck et al. | |
| 2002/0013385 A1 | 1/2002 | Simendinger | |
| 2004/0006190 A1 | 1/2004 | Sakamoto et al. | |
| 2004/0074336 A1 | 4/2004 | Daimon et al. | |
| 2012/0226001 A1 | 9/2012 | Brook et al. | |
| 2012/0264847 A1* | 10/2012 | Thorlaksen | C09D 183/04 523/122 |
| 2014/0141263 A1* | 5/2014 | Jones | C09D 5/1625 427/407.1 |
| 2016/0024314 A1 | 1/2016 | Olsen et al. | |

FOREIGN PATENT DOCUMENTS

| | | |
|---|---|---|
| EP | 2617778 A1 | 7/2013 |
| JP | 11-12541 A | 1/1999 |
| JP | 2000-088153 A | 3/2000 |
| WO | WO-00/77102 A1 | 12/2000 |
| WO | WO-01/72915 A1 | 10/2001 |
| WO | WO-01/81474 A1 | 11/2001 |
| WO | WO 01/81474 * | 12/2001 |
| WO | WO-2006/002630 A1 | 1/2006 |
| WO | WO-2008/013825 A2 | 1/2008 |
| WO | WO-2008/132196 A1 | 11/2008 |
| WO | WO-2008/132236 A2 | 11/2008 |
| WO | WO-2009/062975 A1 | 5/2009 |
| WO | WO-2010/103209 A1 | 9/2010 |
| WO | WO-2011/022827 A1 | 3/2011 |
| WO | WO-2011/076856 A1 | 6/2011 |
| WO | WO/2011/076856 * | 12/2011 |
| WO | WO 2012/175459 * | 12/2012 |
| WO | WO-2012/175459 A1 | 12/2012 |
| WO | WO-2013/000477 A1 | 1/2013 |
| WO | WO-2013/000478 A1 | 1/2013 |
| WO | WO-2013/000479 A1 | 1/2013 |

OTHER PUBLICATIONS

WO 01/81474 machine translation retrieved Jul. 25, 2018.*
WO 01/81474 abstract translation retrieved Jul. 25, 2018.*
Ash et al., Handbook of Paint and Coating Raw Materials, Gower Publ. Ltd., Great Britain vol. 1 pp. 821-823 and 849-51 (1996).
English abstract of JP 10501272 T2 published Feb. 3, 1998.
Machine English Translation of WO 2006/109600 A1 published Nov. 6, 2008.
Machine translation of JP 2000-088153, retrieved Jul. 19, 2018.
Machine translation of WO 01/81474, retrieved Jul. 20, 2018.
Safety Data Sheet, Kurt J. Lesker Co., (May 1, 2012), p. 4.
Silicone Products for Personal Care, Shin-Etsu Chemical Co. Ltd., 2016, p. 7.
Translated Abstract/Summary of WO 01/81474, retrieved Jul. 20, 2018.
Wenzel, Surface roughness and contact angle, J. Phys. Chem. (1949), vol. 53, pp. 1466-77.

* cited by examiner

*Primary Examiner* — Michael B Nelson
(74) *Attorney, Agent, or Firm* — MARSHALL, GERSTEIN & BORUN LLP

(57) ABSTRACT

The present application discloses novel multilayer polysiloxane-based fouling control coating systems having included therein active constituents like biocides and/or enzymes. Further, the polysiloxane-based layers may individually have included as a part thereof hydrophilic oligomer/polymer moieties, and/or said may further comprising one or more hydrophilic-modified polysiloxane oils.

8 Claims, No Drawings

POLYSILOXANE-BASED FOULING CONTROL COATING SYSTEMS

FIELD OF THE INVENTION

The present invention relates to novel multilayer polysiloxane-based fouling control coating systems having included therein active constituents like biocides and/or enzymes.

BACKGROUND OF THE INVENTION

Traditionally, silicone formulations rely on physical means, this being mainly a factor of modulus of elasticity and surface tension to create a low bio-fouling surface. The traditional polydimethylsiloxane (PDMS) coatings have improved drag-reduction over traditional biocide-based antifouling coatings, but they have shown difficulty in resisting bio-fouling overtime, thus decreasing the advantage of drag reduction.

Hence, there is a need for fouling control polysiloxane-based coating compositions combining the benefits of conventional polysiloxane-based fouling-release coating compositions with the benefits of biocide-based antifouling coating compositions.

WO 2011/076856 A1 discloses a fouling control coating composition comprising a polysiloxane-based binder system, 0.01-20% by dry weight of one or more hydrophilic-modified polysiloxanes, and one or more biocides. It is disclosed that hydrophilic-modified polysiloxane serves to facilitate the dissolution and transport of biocide to the surface of a coating and that a high hydrophilicity could lead to early depletion of biocide due to a high leaching rate.

WO 2012/175459 A1 discloses coating systems of a first layer comprising a biocide and subsequent layers which are free or substantially free of biocide. The layers may comprise a polyorganosiloxane. It is disclosed that the foul release properties are generally improved when the subsequent coating layer(s) composition forms a generally hydrophobic or amphiphilic foul release coat when dried and cured, and preferably the equilibrium water contact angle of the subsequent layer(s) is greater than 30 degrees at 23° C.

WO 2013/000479 A discloses a cured paint coat comprising a polysiloxane-based binder matrix and one or more biocides, wherein the binder matrix has included as a part thereof hydrophilic oligomer/polymer moieties.

WO 2013/000477 A discloses a cured fouling control coat comprising a polysiloxane-based binder matrix constituting at least 40% by dry weight of the coat, and one or more enzymes. It is disclosed that the coat may further comprise one or more hydrophilic-modified polysiloxane oils; and that the binder matrix may have included as a part thereof hydrophilic oligomer/polymer moieties.

It is an object of embodiments of the invention to provide alternative multilayer polysiloxane-based fouling control coating systems for further improving the fouling control properties. Desired is also a coating system capable of tuning the biocide leaching rate to make it less dependent on time.

SUMMARY OF THE INVENTION

It has been found by the present inventor(s) that this objective can be achieved by specifically designed fouling control coating systems.

Accordingly, the inventors of the present invention now surprisingly found that improved performance is achieved by a polysiloxane-based fouling control coating system comprising a reservoir of the active ingredients, wherein said reservoir is separated from the hydrophilic surface (i.e. high surface energy) of the coating. Accordingly, the fouling control coating system provided herein has a reservoir of active ingredients in a (first) polysiloxane-based layer which is placed underneath another polysiloxane-based layer. Essential for the fouling control properties are the hydrophilic oligomer/polymer moieties and/or hydrophilic-modified polysiloxane oils comprised in the coating system.

Within the coating system provided herein, the active ingredient(s) diffuses(s) from the reservoir to the surface of the coating. Compared to conventional coatings, a more effective use of the active ingredient is achieved. Moreover, an improved controlled release of active ingredient from the reservoir to the seawater is achieved as compared to conventional coatings. This improved controlled release is even maintained over a prolonged time.

The inventors of the present invention thus succeeded in inventing coating systems providing improved fouling control properties over prolonged time.

Accordingly, the present invention relates to fouling control coating system comprising at least a cured first coat and a cured second coat, wherein:
a) said first coat comprising a polysiloxane-based binder matrix constituting at least 40% by dry weight of said first coat, and more than 50% by weight of the binder matrix being represented by polysiloxane parts, said first coat further comprising one or more active ingredients selected from biocides and enzymes; and
b) said second coat comprising a polysiloxane-based binder matrix constituting at least 40% by dry weight of said second coat, and more than 50% by weight of the binder matrix being represented by polysiloxane parts, wherein, when said one or more active ingredient includes biocide(s),
c) said binder matrix of said first coat having included as a part thereof hydrophilic oligomer/polymer moieties, and/or said first coat further comprising one or more hydrophilic-modified polysiloxane oils, or
d) said binder matrix of said second coat having included as a part thereof hydrophilic oligomer/polymer moieties, and/or said second coat further comprising one or more hydrophilic-modified polysiloxane oils.

An embodiment of the invention relates to such fouling control coating systems comprising at least a cured first coat and a cured second coat, wherein:
a) said first coat comprising a polysiloxane-based binder matrix constituting at least 40% by dry weight of said first coat, and more than 50% by weight of the binder matrix being represented by polysiloxane parts, said first coat further comprising one or more active ingredients selected from biocides and enzymes; and
b) said second coat comprising a polysiloxane-based binder matrix constituting at least 40% by dry weight of said second coat, and more than 50% by weight of the binder matrix being represented by polysiloxane parts,
c) said binder matrix of said first coat and/or of said second coat having included as a part thereof:
hydrophilic oligomer/polymer moieties, and/or
one or more hydrophilic-modified polysiloxane oils.

So, in a first aspect the present invention relates to a fouling control coating system comprising at least a cured first coat and a cured second coat,
a) said first coat comprising a polysiloxane-based binder matrix constituting at least 40% by dry weight of said first coat, and more than 50% by weight of the binder matrix being represented by polysiloxane parts, said first coat further comprising one or more active ingredients selected from biocides and enzymes; and b) said second coat comprising a polysiloxane-based binder matrix constituting at least 40% by dry weight of said second coat, and more than 50% by weight of the binder matrix being represented by polysiloxane parts, c) said binder matrix of said second coat having included as a part thereof hydrophilic oligomer/polymer moieties, and/or said second coat further comprising one or more hydrophilic-modified polysiloxane oils.

In a second alternative aspect, the present invention relates to a fouling control coating system comprising at least a cured first coat and a cured second coat, a) said first coat comprising a polysiloxane-based binder matrix constituting at least 40% by dry weight of said first coat, and more than 50% by weight of the binder matrix being represented by polysiloxane parts, said first coat further comprising one or more active ingredients selected from biocides and enzymes;

b) said binder matrix of said first coat having included as a part thereof hydrophilic oligomer/polymer moieties, and/or said first coat further comprising one or more hydrophilic-modified polysiloxane oils; and c) said second coat comprising a polysiloxane-based binder matrix constituting at least 40% by dry weight of said second coat, and more than 50% by weight of the binder matrix being represented by polysiloxane parts.

In a third alternative aspect, the present invention relates to a fouling control coating system comprising at least a cured first coat and a cured second coat, a) said first coat comprising a polysiloxane-based binder matrix constituting at least 40% by dry weight of said first coat, and more than 50% by weight of the binder matrix being represented by polysiloxane parts, said first coat further comprising one or more enzymes; and b) said second coat comprising a polysiloxane-based binder matrix constituting at least 40% by dry weight of said second coat, and more than 50% by weight of the binder matrix being represented by polysiloxane parts.

Reading the below disclosure and examples, the skilled person will realize, that a few ratios, concentrations and other kind of measures explicitly refer to a 'wet film' or 'wet thickness'. In those cases said ratio, concentration or measure applies immediate after application of the wet paint.

In other cases, a dry weight form basis for such ratio, concentration or other measure. In those cases said ratio, concentration or measure applies for a cured composition not yet exposed to marine conditions. Upon exposure to e.g. sea water such ratios, concentrations and other measures given (e.g. the concentration of active ingredients) will typically change as a consequence of the mechanism of action outlined herein above.

DETAILED DISCLOSURE OF THE INVENTION

The Fouling Control Coating System

The present invention i.a. relates to a fouling control coating system comprising at least a cured first coat and a cured second coat, cf. the three alternative aspects of the invention described in detail further below.

It should be understood that the expression "fouling control" (as well as "fouling release") relates to all types of bio-fouling of a surface (i.e. settlement of organisms on a surface), in particular surfaces exposed to an aqueous environment or to aqueous liquids (e.g. within tanks, pipes, etc.). It is however, believed that the coatings defined herein are particularly relevant for avoiding or reducing marine bio-fouling, i.e. bio-fouling arising in connection with the exposure of a surface to a marine environment, in particular to sea-water.

It should also be understood that the cured first coat as well as the cured second coat are prepared on a substrate in such a way that the second coat is prepared on top of the first coat. Also, it should be understood that the first coat may be prepared on an already existing coating layer, e.g. an anti-corrosive coating layer, or a tie-coat layer, or an aged antifouling or fouling release coat, etc., or directly on a native substrate (see further below in the section "Application of coating compositions"). Moreover, although the second coat is preferably the outermost layer, the second coat may in principle be over-coated with a further coating layer.

Hence, the fouling control coating system comprises at least a cured first coat and a cured second coat. First, the polysiloxane-based binder matrix which is present in the first coat as well as in the second coat (except that the matrix is not necessarily identical) is described in the section "The polysiloxane-based binder matrix" below. Subsequently, the specific features of the cured first coat is described in the section "The cured first coat" below, whereas the specific features of the cured second coat is further described in the section "The cured second coat" further below.

It should be understood that although the first coat and the second coat are of the same type (i.e. polysiloxane-based), the first coat and the second coat are not identical. In particular, it is preferred that the first coat and the second coat differs with respect to at least one of i) the content and/or type of the active ingredient, ii) the content and/or type of hydrophilic oligomer/polymer moieties (of the binder matrix), and iii) the content and/or type of the hydrophilic-modified polysiloxane oil.

Further embodiments of how the first coat and the second coat are prepared are outlined in the sections "Application of the coating system" and "A marine structure" further below.

The Polysiloxane-Based Binder Matrix

The polysiloxane-based binder matrix (cf. the first coat and the second coat) is preferably made up of reactive polysiloxane binder components, e.g. functional organopolysiloxanes (such as polydialkylsiloxane, polyarylsiloxane, polyalkylaryl siloxane or combinations thereof), cross-linkers, silicates (e.g. ethyl silicate), and the like. Thus, it is believed that the reaction between such components will result in the binder matrix in the form of a typically three-dimensional covalently interconnected network.

In non-limiting embodiments of the present invention, the polysiloxane-based binder matrix contains:

polysiloxane parts as disclosed herein, such as diorganopolysiloxane(s) of formula (1), (1x) or combinations thereof;

hydrophilic oligomer/polymer moieties as defined herein, such as:

a) hydrophilic oligomer/polymer moieties of formula (1c) or (2a) which are included in the binder matrix by:
grafting as side chains, e.g. as outlined in formulae (1f), or
introduction into the polysiloxane backbone, e.g. as outlined in formulae (1d), (2a) or (1g), or
any combination thereof; and/or b) non-reactive hydrophilic-modified polysiloxane oils, such as
polysiloxane having grafted thereto poly(oxyalkylene) chains as disclosed herein, e.g. outlined in formula (A), polysiloxane having incorporated in the backbone thereof poly(oxyalkylene) chains as disclosed herein, e.g. as outlined in formula (B), or polysiloxane having incorporated in the backbone thereof polyoxyalkylene chains and having grafted thereto polyoxyalkylene chains as disclosed herein, e.g. as outlined in formula (c);

cross-linker(s) as defined herein, such as a cross linker selected from those of formula (2); and other constituents, e.g. additives, pigments, fillers, etc., as well as any biocide(s) and any enzyme(s) as disclosed herein below.

In one embodiment, the hydrophilic oligomer/polymer moieties are not included in the binder matrix by means of introduction of oligomer/polymers for formula (1g) in the polymer backbone. In another embodiment, the hydrophilic oligomer/polymer moieties are not included in the binder matrix in the polymer backbone, but are instead included in the binder matrix by grafting as side chains.

The cured paint coat may be formed in various ways, e.g. polymerization/cross-linking by formation of siloxane bonds through a condensation reaction or by the use of their reactive groups such as for example amine/epoxy, carbinol/isocyanate etc. A condensation reaction is preferred.

The polysiloxane-based binder matrix is prepared from a polysiloxane based binder which is a functional organopolysiloxane, with terminal and/or pendant functionality. The terminal functionality is preferred. The functionality can either be hydrolysable groups, such as for example alkoxy groups, ketoxime groups or the functionality can be silanol groups. A minimum of two reactive groups per molecule is preferred. If the molecule contains only two reactive groups, for example silanol groups, it may be necessary to use an additional reactant, a cross-linker, to obtain the desired cross-link density. The cross-linker can for example be an alkoxy silane such as methyltrimethoxysilane, but a wide range of useful silanes are available as will be described further on. The silane can be used as it is or as hydrolysation-condensation products of same. Although condensation cure is much preferred, the functionality of the organopolysiloxane is not limited to a condensation cure. If so desired, other types of curing can be utilized, for example amine/epoxy either alone or in combination with a condensation reaction. In such cases, the organopolysiloxane can have terminal groups of epoxy or amine and pendant hydrolysable groups, for example with alkoxyfunctionality.

In some embodiments, the fouling control coating composition (i.e. the composition for the preparation of the first coat and the second coat, respectively) including the polysiloxane-based binder system may be a reaction-curable composition or a condensation-curable composition as will be evident for the person skilled in the art. Examples hereof are a two-component condensation curing composition based on a silanol-reactive polydiorganosiloxane and a silane with hydrolysable groups, or a one-component condensation-curable composition based on a polydiorganosiloxane with alkoxy or other hydrolysable reactivity. Another example is a reaction curable composition based on an epoxyfunctional polysiloxane binder and an amine functional polysiloxane curing agent. Combinations of reaction-curable compositions and condensation-curable compositions are possible, if the binder or the curing agent (or both) includes condensation curable groups, such as alkoxy groups.

In one embodiment, the binder phase comprises (i) a binder and (ii) a cross-linking agent of which the binder (i) should include hydrolysable groups or other reactive groups so as to participate in the formation of the matrix.

The binder (i) typically constitutes 40-90% by dry weight of the coating composition.

The cross-linking agent (ii) preferably constitutes 0-10% by dry weight of the coating composition and is, e.g., an organosilicon compound represented by the general formula (2) shown below, a partial hydrolysis-condensation product thereof, or a mixture of the two:

$$R_3-Si-X_{4-a} \quad (2)$$

wherein, each R represents, independently, an unsubstituted or substituted monovalent hydrocarbon group of 1 to 6 carbon atoms or a hydrolysable group, each X represents, independently, a hydrolysable group, and a represents an integer from 0 to 2, such as from 0 to 1.

Within the art of polymer chemistry, it is well-known that the term 'partial hydrolysis-condensation product' refers to such compound wherein the compound has been allowed to react with it-self in a condensation reaction creating oligomer or polymer. However such oligomers or polymers still retain the reactive/hydrolysable groups used in the cross-linking reaction.

The compound outlined in formula (2) acts as a cross-linker for the binder (i). The composition can be formulated as a one component curable RTV (room-temperature vulcanizable) by admixing the binder (i) and the cross-linking agent (ii). If the reactivity on the terminal Si-group of the binder (i) consist of readily hydrolysable groups, such as dimethoxy or trimethoxy, a separate cross-linker is usually not necessary to cure the film. The technology behind the curing mechanism and examples of cross-linkers is described in prior art (US 2004/006190).

In one embodiment, R represents a hydrophilic group such as a poly(oxyalkylene). In this case, it is preferred to have a $C_{2-5}$-alkyl spacer between the Si-atom and the polyoxyalkylene group. Hence, the organopolysiloxane may have oxyalkylene domains.

Preferred cross-linkers are those selected from tetramethoxysilane, tetraethoxysilane; tetrapropoxysilane; tetra-n-butoxysilane; vinyltris(methylethyloximino)silane; vinyltris-(acetoxime)silane; methyltris(methylethyloximino)silane; methyltris(acetoxime)silane; vinyltrimethoxysilane; methyltrimethoxysilane; vinyltris(isopropenoxy)silane; tetraacetoxy-silane; methyltriacetoxysilane; ethyltriacetoxysilane; vinyltriacetoxysilane; di-f-butoxy-diacetoxysilane; methyltris(ethyllactate)silane and vinyltris(ethyllactate)silane as well as hydrolysis-condensation products of the same.

More preferred cross-linkers are tetraethoxysilane; vinyltris(methylethyloximino)silane; methyltris(methylethyloximino)silane; vinyltrimethoxysilane; methyltris(methylethyloximino)silane; methyltris(ethyllactate)silane vinyltris(ethyllactate)silane as well as hydrolysis-condensation products of the same.

More preferred cross-linkers are tetraethoxysilane; vinyltrimethoxysilane; methyltris(ethyllactate)silane; vinyltris(ethyllactate)silane, as well as hydrolysis-condensation products of the same. In a specific embodiment, said cross-linker is tetraethoxysilane or a hydrolysis-condensation product thereof. In another specific embodiment, said cross-linker is vinyltrimethoxysilane or a hydrolysis condensation product thereof. In yet another specific embodiment, said cross-linker is methyltris(ethyllactate)silane or a hydrolysis-condensation product thereof. In yet another specific embodiment, said cross-linker is vinyltris(ethyllactate)silane or a hydrolysis-condensation products thereof. In one further embodiment, said cross-linker is a hydrolysis-condensation product. In another embodiment, said cross-linker is not a hydrolysis-condensation product.

Other interesting cross-linkers are those selected from vinyltriethoxysilane, methyltriethoxy-silane, ethyltrimethoxysilane, ethyltrimethoxysilane, tetraisopropoxysilane, tetrabutoxysilane as well as hydrolysis-condensation products of the same.

The term 'polysiloxane' is well-known to designate such polymers having a backbone in which atoms of silicon and oxygen alternate and which is devoid of carbon atoms (The New Encyclopedia Britannica in 30 volumes micropaedia volume IX. 1975 defining polysiloxane by referral to silicone). Similarly, the term polyorganosiloxane is intended to mean a polysiloxane backbone with organic (i.e. carbon-based) substituent on the silicon atoms.

In some interesting embodiments, the polysiloxane-based binder comprises a polydimethyl-siloxane-based binder.

In other interesting embodiments, the binder may include fluoro-modifications, e.g. fluoroalkyl modified polysiloxane binders such as silanol-terminated poly(trifluoropropyl-methylsiloxane).

The polysiloxane-based binder matrix typically constitutes at least 40% by dry weight, at least 50% by dry weight, preferably at least 60% by dry weight, e.g. at least 70% by weight, in particular 50-90% by dry weight, or 50-98% by dry weight, e.g. 50-96% by dry weight, in particular 60-95% by dry weight, or 50-95% by dry weight, or 60-94% by dry weight, or 70-96% by dry weight, or even 70-94% by dry weight, or 75-93% by dry weight, or 75-92% by dry weight, of the coating composition or of the cured coat.

The binder is in the form of a cross-linked matrix which incorporates other constituents, e.g. additives, pigments, fillers, etc., as well as any hydrophilic-modified polysiloxane oil(s) (see below), any biocide(s) and any enzyme(s) (see below), in the fouling control coat.

The term "polysiloxane-based binder matrix" is intended to mean that the binder matrix mainly consists of polysiloxane parts (i.e. that more than 50% by weight, preferably more than 60% by weight, e.g. more than 70% by weight, of the binder matrix is represented by polysiloxane parts. Preferably the polysiloxane parts constitute 50-100% by weight, e.g. 50-99.9% by weight, in particular 60-100% by weight, or 50-99% by weight, or 60-98% by weight, or 70-97% by weight, or even 70-99% by weight, or 80-98% by weight, or 90-97% by weight, of the binder matrix (i.e. the binder components and any cross-linkers). The remainder of the binder matrix may e.g.—if present—be made of any hydrophilic oligomer/polymer moieties and any (non-polysiloxane-type) cross-linkers.

When calculating the amount of the polysiloxane parts and any other parts (e.g. any hydrophilic oligomer/polymer moieties), respectively, for a given starting material (or an adduct), it is typically fairly straightforward to distinguish between the two. However, in order to eliminate any doubt about any linkers between the two, it should be understood that the hydrophilic oligomer/polymer moieties include all atoms up to, but not including, the silicon atom which is adjacent to the hydrophilic oligomer/polymer moiety. As an example, in a structure of the type [polysiloxane-O]—Si(Me)$_2$—CH$_2$CH$_2$CH$_2$-[hydrophilic oligomer]-CH$_2$CH$_2$CH$_2$—Si(Me)$_2$—[O-polysiloxane], the [polysiloxane-O]—Si(Me)$_2$ parts are accounted for as silicone parts, whereas the CH$_2$CH$_2$CH$_2$-[hydrophilic oligomer]-CH$_2$CH$_2$CH$_2$ moiety is accounted for as the hydrophilic oligomer moiety.

Catalyst

The coating compositions used for forming each of the first coat and the second coat may further comprise a condensation catalyst to accelerate the cross-linking. Examples of suitable catalysts include organometal- and metal salts of organic carboxylic acids, such as dibutyl tin dilaurate, dibutyl tin diacetate, dibutyl tin dioctoate, dibutyl tin 2-ethylhexanoate, dioctyl tin dilaurate, dioctyl tin diacetate, dioctyl tin dioctoate, dioctyl tin 2-ethylhexanoate, dioctyltin di neodecanoate, tin naphthenate, tin butyrate, tin oleate, tin caprylate, bismuth 2-ethylhexanoate, bismuth octanoate, bismuth neodecanoate, iron 2-ethylhexanoate, lead 2-ethyloctoate, cobalt-2-ethylhexanoate, manganese 2-ethylhexanoate, zinc 2-ethylhexanoate, zinc naphthenate, zinc stearate, cobalt naphthenate and titanium naphtenate; titanate- and zirconate esters such as tetrabutyl titanate, tetrakis(2-ethylhexyl)titanate, triethanolamine titanate, tetra(isopropenoxy)titanate, titanium tetrabutanolate, titanium tatrapropanolate; titanium tetraisopropanolate, zirconium tetrapropanolate, zirconium tetrabutanolate; chelated titanates such as diisopropyl bis(acetylacetonyl)titanate; and phosphate-based catalysts like (bis(2-ethyl-hexyl)hydrogen phosphate. Further catalysts include tertiary amines, such as triethylamine, tetrametylethylenediamine, pentamethyldiethylenetriamine and 1,4-ethylenepiperazine. Further examples include guanidine based catalysts. Even further examples of condensation catalysts are described in WO 2008/132196 and US 2004/006190.

The catalyst may be used alone or as combination of two or more catalysts. In one embodiment, said catalyst(s) are selected from the group consisting of tin and titanium oxide(s) (titanate(s)). In one specific embodiment, said catalyst is tin-based. In one embodiment, a catalyst is included, which is devoid of tin. In another embodiment, said catalyst comprises one or more titanium oxide(s) (titanate(s)). The amount of catalyst to be used is depending on the reactivity of the catalyst and the cross-linker(s) and desired drying time. In a preferred embodiment the catalyst concentration is between 0.01-10%, e.g. 0.01-3.0%, or 5.0-10%, or 0.1-4.0%, or 1.0-6.0%, by weight of the total combined amount of the binder (i) and cross-linking agent (ii).

In some embodiments, a catalyst is not included.

Solvents, Additives, Pigments and Fillers

The coating compositions used for forming each of the first coat and the second coat may further comprise solvents and additives.

Examples of solvents are aliphatic, cycloaliphatic and aromatic hydrocarbons such as white spirit, cyclohexane, toluene, xylene and naphtha solvent, esters such as methoxypropyl acetate, n-butyl acetate and 2-ethoxyethyl acetate; octamethyltrisiloxane, and mixtures thereof. Alternatively, the solvent system may include water or be water-based (>50% water in the solvent system).

In one embodiment, the solvents are selected from aliphatic, cycloaliphatic and aromatic hydrocarbons such as white spirit, cyclohexane, toluene, xylene and naphtha solvent, esters such as methoxypropyl acetate, n-butyl acetate and 2-ethoxyethyl acetate; octamethyltrisiloxane, and mixtures thereof, preferably those solvents having a boiling point of 110° C. or more.

The solvents, if any, typically constitute 5-50% by volume of the coating composition.

Examples of additives are:
(i) non-reactive fluids such as organopolysiloxanes; for example polydimethylsiloxane, methylphenyl polysiloxane; petroleum oils and combinations thereof;
(ii) surfactants such as derivatives of propylene oxide or ethylene oxide such as alkylphenol-ethylene oxide condensates (alkylphenol ethoxylates); ethoxylated monoethanol-amides of unsaturated fatty acids such as ethoxylated mono-ethanolamides of linoleic acid; sodium dodecyl sulfate; and soya lecithin;

(iii) wetting agents and dispersants such as those described in M. Ash and I. Ash, "Handbook of Paint and Coating Raw Materials, Vol. 1", 1996, Gower Publ. Ltd., Great Britain, pp 821-823 and 849-851;

(iv) thickeners and anti-settling agents (e.g. thixotropic agents) such as colloidal silica, hydrated aluminium silicate (bentonite), aluminium tristearate, aluminium monostearate, xanthan gum, chrysotile, pyrogenic silica, hydrogenated castor oil, organo-modified clays, polyamide waxes and polyethylene waxes;

(v) dyes such as 1,4-bis(butylamino)anthraquinone and other anthraquinone derivatives; toluidine dyes, etc.; and (vi) antioxidants such as bis(tert-butyl) hydroquinone, 2,6-bis(tert-butyl) phenol, resorcinol, 4-tert-butyl catechol, tris (2,4-di-tert-butylphenyl)phosphite, pentaerythritol Tetrakis (3-(3,5-di-tert-butyl-4-hydroxyphenyl)propionate), bis(2,2,6,6,-tetramethyl-4-piperidyl)sebacate, etc.

Any additives typically constitute 0-30%, such as 0-15%, by dry weight of the coating composition.

Preferably, the coating composition comprises one or more thickeners and/or anti-settling agents (e.g. thixotropic agents), preferably in an amount of 0.2-10%, such as 0.5-5%, e.g. 0.6-4%, by dry weight of the coating composition.

Furthermore, the coating composition used for forming the first coat and the second coat may comprise pigments and fillers.

Pigments and fillers are in the present context viewed in conjunction as constituents that may be added to the coating composition with only limited implications on the adhesion properties. "Pigments" are normally characterised in that they render the final paint coating non-transparent and non-translucent, whereas "fillers" normally are character-ised in that they do not render the paint non-translucent and therefore do not contribute significantly to hide any material below the coating.

Examples of pigments are grades of titanium dioxide, red iron oxide, zinc oxide, carbon black, graphite, yellow iron oxide, red molybdate, yellow molybdate, zinc sulfide, anti-mony oxide, sodium aluminium sulfosilicates, quinacri-dones, phthalocyanine blue, phthalocyanine green, black iron oxide, indanthrone blue, cobalt aluminium oxide, car-bazole dioxazine, chromium oxide, isoindoline orange, bis-acetoacet-o-tolidiole, benzimidazolon, quinaphtalone yel-low, isoindoline yellow, tetrachloroisoindolinone, quinophthalone yellow.

Examples of fillers are calcium carbonate such as calcite, dolomite, talc, mica, feldspar, barium sulfate, kaolin, neph-elin, silica, perlite, magnesium oxide, and quartz flour, etc. Fillers (and pigments) may also be added in the form of nanotubes or fibres, thus, apart from the before-mentioned examples of fillers, the coating composition may also com-prise fibres, e.g. those generally and specifically described in WO 00/77102 which is hereby incorporated by reference.

Any pigments and/or fillers typically constitute 0-60%, such as 0-50%, preferably 5-45%, such as 5-40%, or 5-35%, or 0.5-25%, or 1-20%, by dry weight of the coating com-position. Taking into account the density of any pigments and/or fillers, such constituents typically constitute 0.2-20%, such as 0.5-15% by solids volume of the coating composi-tion With the aim of facilitating easy application of the coating composition corresponding the to the first coat and the second coat (e.g. by spray, brush or roller application techniques), the coating composition typically has a viscos-ity in the range of 25-25,000 mPa·s, such as in the range of 150-15,000 mPa·s, in particular in the range of 200-4,000 mPa·s.

First Alternative Aspect of the Invention

The Cured First Coat

The cured first coat comprises a polysiloxane-based binder matrix constituting at least 40% by dry weight of said first coat, and more than 50% by weight of the binder matrix is represented by polysiloxane parts. A particular feature of the first coat is that it further comprises one or more active ingredients selected from biocides and enzymes.

It should be understood that the first coat may comprise one biocide, one enzyme, a combination of one biocide and one enzyme, a combination of two biocides, a combination of two enzymes, one or more biocides, one or more enzymes, a combination of one or more biocides and one or more enzymes, etc.

Biocides

In one variant, the active ingredient included in the first coat comprises one or more biocides.

In the present context, the term "biocide" is intended to mean an active substance intended to destroy, deter, render harmless, prevent the action of, or otherwise exert a con-trolling effect on any harmful organism by chemical or biological means. However, it should be understood, that the biocide(s)—if present—can be used in combination with one or more enzymes (see below).

Illustrative examples of biocides are those selected from metallo-dithiocarbamates such as bis(dimethyldithiocarba-mato)zinc, ethylene-bis(dithiocarbamato)zinc, ethylene-bis (dithio-carbamato)manganese, dimethyl dithiocarbamate zinc, and complexes between these; bis(1-hydroxy-2(1H)-pyridinethionato-O,S)-copper; copper acrylate; bis(1-hy-droxy-2(1H)-pyridine-thionato-O,S)-zinc; phenyl(bis-pyridyl)-bismuth dichloride; metal biocides such as copper (I)oxide, cuprous oxide, metallic copper, copper metal alloys such as copper-nickel alloys like copper bronze; metal salts such as cuprous thiocyanate, basic copper carbonate, copper hydroxide, barium metaborate, copper chloride, silver chlo-ride, silver nitrate and copper sulphide; heterocyclic nitro-gen compounds such as 3a,4,7,7a-tetrahydro-2-((trichlorom-ethyl)-thio)-1H-isoindole-1,3(2H)-dione, pyridine-triphenylborane, 1-(2,4,6-trichlorophenyl)-1H-pyrrole-2,5-dione, 2,3,5,6-tetrachloro-4-(methylsulfonyl)-pyridine, 2-methylthio-4-tert-butylamino-6-cyclopropylamine-s-tri-azin, and quinoline derivatives; heterocyclic sulfur com-pounds such as 2-(4-thiazolyl)benzimidazole, 4,5-dichloro-2-n-octyl-4-isothiazolin-3-one, 4,5-dichloro-2-octyl-3(2H)-isothiazoline (Sea-Nine®-211N), 1,2-benz-isothiazolin-3-one, and 2-(thiocyanatomethylthio)-benzothiazole; urea derivatives such as N-(1,3-bis(hydroxylmethyl)-2,5-dioxo-4-imidazolidinyl)-N,N'-bis(hydroxymethyl)urea, and N-(3, 4-dichlorophenyl)-N,N-dimethylurea, N,N-dimethylchloro-phenylurea; amides or imides of carboxylic acids; sulfonic acids and of sulfenic acids such as 2,4,6-trichlorophenyl maleimide, 1,1-dichloro-N-((dimethylamino)sulfonyl)-1-fluoro-N-(4-methylphenyl)-methanesulfenamide, 2,2-di-bromo-3-nitrilo-propionamide, N-(fluorodichloromethyl-thio)-phthalimide, N,N-dimethyl-N'-phenyl-N'-(fluorodichloromethylthio)-sulfamide, and N-methylol formamide; salts or esters of carboxylic acids such as 2-((3-iodo-2-propynyl)oxy)-ethanol phenylcarbamate and N,N-didecyl-N-methyl-poly(oxyethyl)ammonium propi-onate; amines such as dehydroabiethyl-amines and cocodi-methylamine; substituted methane such as di(2-hydroxyethoxy)methane, 5,5'-dichloro-2,2'-dihydroxydiphenylmethane, and methylene-bisthiocyanate; substituted benzene such as 2,4,5,6-tetrachloro-1,3-benzenedicarbonitrile, 1,1-dichloro-N-((dimethyl-amino)-sulfonyl)-1-fluoro-N-phenylmethanesulfenamide, and 1-((diiodomethyl)sulfonyl)-4-methyl-benzene; tetraalkyl phosphonium halogenides such as tri-n-butyltetradecyl phosphonium chloride; guanidine derivatives such as n-dodecylguanidine hydrochloride; disulfides such as bis-(dimethylthiocarbamoyl)-disulfide, tetramethylthiuram disulfide; imidazole containing compound, such as medetomidine; 2-(p-chlorophenyl)-3-cyano-4-bromo-5-trifluoromethyl pyrrole; bis(N-cyclohexyl-diazenium dioxy) copper, thiabendazole, N-trihalomethyl thiopthalimides, trihalomethyl thiosulphamides, capsaicin, 3-iodo-2-propynylbutyl carbamate, 1,4-dithiaanthraquinone-2,3-dicarbonitrile (dithianon), furanones such as 3-butyl-5-(dibromomethylidene)-2(5H)-furanone, macrocyclic lactones such as avermectins; and mixtures thereof.

Presently, it is preferred that the biocide (if present) does not comprise tin.

Currently preferred biocides are those selected from the group consisting of 2,4,5,6-tetra-chloroisophtalonitrile (Chlorothalonil), copper thiocyanate (cuprous sulfocyanate), N-dichloro-fluoromethylthio-N',N'-dimethyl-N-phenylsulfamide (Dichlofluanid), 3-(3,4-dichlorophenyl)-1,1-dimethylurea (Diuron), $N^2$-tert-butyl-$N^4$-cyclopropyl-6-methylthio-1,3,5-triazine-2,4-diamine (Cybutryne), 4-bromo-2-(4-chlorophenyl)-5-(trifluoromethyl)-1H-pyrrole-3-carbonitrile, (2-(p-chlorophenyl)-3-cyano-4-bromo-5-trifluoromethyl pyrrole; Tralopyril), $N^2$-tert-butyl-$N^4$-cyclopropyl-G-methylthio-1,3,5-triazine-2,4-diamine (Cybutryne), (RS)-4-[1-(2,3-dimethylphenyl)ethyl]-3H-imidazole (Medetomidine), 4,5-dichloro-2-n-octyl-4-isothiazolin-3-one (DCOIT, Sea-Nine® 211N), dichlor-N-((dimethylamino)sulfonyl)fluor-N-(p-tolyl)methansulfenamid (Tolylfluanid), 2-(thiocyanomethylthio)-1,3-benzothiazole ((2-benzothiazolylthio)methyl thiocyanate; TCMTB), triphenylborane pyridine (TPBP); bis(1-hydroxy-2(1H)-pyridinethionato-O,S)—(T-4) zinc (zinc pyridinethione; zinc pyrithione), bis(1-hydroxy-2(1H)-pyridinethionato-O,S)—T-4) copper (copper pyridinethione; copper pyrithione), zinc ethylene-1,2-bis-dithiocarbamate (zinc-ethylene-N—N'-dithiocarbamate; Zineb), copper (i) oxide, metallic copper, 3-(3,4-dichlorophenyl)-1,1-dimethylurea (Diuron) and diiodomethyl-p-tolylsulfone; Amical 48. Preferably at least one biocide is selected from the above list.

In a particularly preferred embodiment, the biocides are preferably selected among biocides which are effective against soft fouling such as slime and algae. Examples of such biocides are $N^2$-tert-butyl-$N^4$-cyclopropyl-6-methylthio-1,3,5-triazine-2,4-diamine (Cybutryne), 4,5-dichloro-2-n-octyl-4-isothiazolin-3-one (DCOIT, Sea-Nine® 211N), bis(1-hydroxy-2(1H)-pyridinethionato-O,S)—(T-4) zinc (zinc pyridinethione; zinc pyrithione), bis(1-hydroxy-2(1H)-pyridinethionato-O,S)—T-4) copper (copper pyridinethione; copper pyrithione; Copper Omadine) and zinc ethylene-1,2-bis-dithiocarbamate (zinc-ethylene-N—N'-dithiocarbamate; Zineb), copper(I) oxide, metallic copper, copper thiocyanate, (cuprous sulfocyanate), bis(1-hydroxy-2(1H)-pyridinethionato-O,S)—T-4) copper (copper pyridinethione; copper pyrithione; Copper Omadine).

In a further particularly preferred embodiment, the biocide is an organic biocide, such as a pyrithione complex, such as zinc pyrithione, or such as copper pyrithione. In a most preferred embodiment, the biocide is copper pyrithione. Organic biocides are those either fully or in part being of organic origin. In another preferred embodiment one of the biocides is zinc-based. In a specific embodiment thereof, said biocide is zinc ethylene-1,2-bis-dithiocarbamate (zinc-ethylene-N—N'-dithiocarbamate; Zineb). As detailed in U.S. Pat. No. 7,377,968, in those instances in which the biocide is depleted rapidly from the film due to e.g. a high water solubility or a high level of immiscibility with the matrix composition, it can be advantageous to add one or more of the biocide(s) in encapsulated form as a means of controlling the biocide dosage and extending the effective lifetime in the film. Encapsulated biocides can also be added if the free biocide alters the properties of the polysiloxane matrix in a way that is detrimental for its use as antifouling coatings (e.g. mechanical integrity, drying times, etc.).

In one embodiment, the biocide is encapsulated 4,5-dichloro-2-n-octyl-4-isothiazolin-3-one (Sea-Nine CR2).

The biocide preferably has a solubility in the range of 0-20 mg/L, such as 0.00001-20 mg/L, in water at 25° C.

If present, the biocide typically constitutes 0.1-30% by dry weight, e.g. 0.5-25% by dry weight, in particular 1-20% by dry weight, such as 3-15% by dry weight, of the coating composition.

The biocide typically constitutes 0.1-25% by solids volume, e.g. 0.5-20% by solids volume, in particular 1-15% by solids volume, of the coating composition.

In another embodiment the biocide constitutes 1-10% by solids volume of the coating composition, such as 2-9%, or 3-8%, or even 4-7%, by solids volume of the coating composition.

As is apparent from the various aspects disclosed herein, whenever comprised in a composition, the biocide is comprised in the first coat of the coating system disclosed herein. Consequently, in most embodiments, the second coat is devoid of any biocides.

In an embodiment, the second coat of the coating system disclosed herein comprises biocide but neither hydrophilic oligomer/polymer moieties nor hydrophilic-modified polysiloxane oil. In a particular embodiment thereof, the amount of biocide comprised in the second coat is less than the amount of biocide comprised in the first coat, such as less than 70%, e.g. less than 50%, or less than 25%.

Enzymes

In another variant, the active ingredient included in the first coat comprises one or more enzymes.

Inclusion of the one or more enzymes in the first coat is believed to improve the resistance towards bio-fouling of said polysiloxane-based fouling control system over a polysiloxane based fouling release system where enzymes are only in the outer-most coat, by controlling the release of said enzymes to the environment. The enzymes contribute to the fouling control properties of the coating by preventing settlement before or during, or alternatively reverting settlement. Even though siloxane-based fouling control coatings in themselves are very good at hindering settlement of bio-fouling organisms, enzymes can contribute to the overall antifouling ability of the fouling control system, either by selected targeted mechanisms towards specifically troublesome bio-fouling species, or by a general improvement of the protection mechanism via a broad spectrum antifouling mechanism.

All enzymes capable of preventing settlement of bio-fouling organisms are considered relevant for this invention. However of particular interest are hydrolytic enzymes. Hydrolytic enzymes are those selected from EC class 3. Of particular interest are those selected from the following EC classes:

EC 3.1: ester bonds (esterases: nucleases, phosphodiesterases, lipase, phosphatase)
EC 3.2: sugars (DNA glycosylases, glycoside hydrolase)
EC 3.3: ether bonds
EC 3.4: peptide bonds (Proteases/peptidases)
EC 3.5: carbon-nitrogen bonds, other than peptide bonds
EC 3.6: acid anhydrides (acid anhydride hydrolases, including helicases and GTPase)
EC 3.7: carbon-carbon bonds
EC 3.8: halide bonds
EC 3.9: phosphorus-nitrogen bonds
EC 3.10: sulfur-nitrogen bonds
EC 3.11: carbon-phosphorus bonds
EC 3.12: sulfur-sulfur bonds
EC 3.13: carbon-sulfur bonds
EC 4.2: includes lyases that cleave carbon-oxygen bonds, such as dehydratases In one embodiment, the one or more enzymes include a hydrolytic enzyme.

In one embodiment, the one or more enzymes are selected from EC classes: EC 3.1, EC 3.2, EC 3.4 and EC 4.2.

In another embodiment, the one or more enzymes are selected from serine proteases, cysteine proteases, metalloproteinase, cellulase, hemicellulase, pectinase, and glycosidases.

Commercial examples of enzymes which are believed to be useful are Savinase® (ex Novozymes A/S), Endolase® (ex Novozymes A/S), Alcalase® (ex Novozymes A/S), Esperase®(ex Novozymes), Papain (ex Sigmaaldrich), Subtilisin Carlsberg (ex Sigmaaldrich), pectinase (ex Sigmaaldrich), and polygalacturonase (ex Sigmaaldrich).

In one embodiment, the one or more enzymes include an enzyme which is capable of degrading the exopolymeric substances (i.e. adhesives) of barnacles. Thus, the enzyme must deter settlement of barnacle cypris larvae, preferably without killing or in other ways exerting the barnacle to toxic effects. The ability of an enzyme to reversibly hinder settlement of barnacles can be tested in accordance with the "Barnacles settlement test" described in the Experimentals section herein.

In another embodiment, the one or more enzymes include an enzyme which is capable of degrading the exopolymeric substances (i.e. adhesives) of algae. Thus the enzyme must deter settlement of algal zoospores, preferably without killing or in other ways exerting the algal zoospore to toxic effects. The ability of an enzyme to reversibly hinder settlement of algae can be tested in accordance with the "Algae settlement test" described in the Experimentals section herein.

In another embodiment, the one or more enzymes include an enzyme which is selected to exert an effect on specific organisms, be it toxic or not. Hence, in this embodiment, the effect of the enzyme may, in addition to being settlement lowering, also affect viability and mortality of the bio-fouling organism in question.

In some interesting embodiments, the one or more enzymes are pre-formulated before being mixed with other paint constituents. For example, the enzymes may be immobilized on or within filler particles, on binder constituents, or—if such constituents are also present—be formulated with hydrophilic mono-, oligo-, or polymers or with hydrophilic-modified polysiloxane oils (see further below).

In one interesting embodiment, the one or more enzymes (or one or some of the one or more enzymes) are formulated, e.g. either by surface treatment or by immobilisation.

In one variant, the one or more enzymes may be entrapped in an aerogel, xerogel, or kryogel-type matrix in a manner similar to that described in WO 2009/062975, in order to obtain stability in the wet paint, compatibility with the cured coat and controlled release of the enzymes when the network of the encapsulation material is degraded by hydrolysis by seawater.

Similarly, the enzymes may be encapsulated in a polymeric material, similar to the material described in U.S. Pat. No. 7,377,968, in order for the enzymes to be shielded from xylene, but not from seawater.

Another way of pre-treating the enzyme is by ionic interaction with either a polyanionic or polycationic material. Depending on the pi of the enzyme, a polymer carrying the suitable charge will affiliate strongly to enzymes giving rise to ionic cross-linking and thus stabilisation of the enzymes.

Adsorption onto a suitable material, such as clay or nitrocellulose, is an alternative way to obtain increased enzyme stability during the preparation, application and curing of an enzyme-containing fouling control coating.

Establishment of covalent bonds between enzymes, using bifunctional cross-linkers can also potentially improve the enzyme stability. This can be referred to as both cross-linking and co-polymerisation. Cross-linked enzyme aggregates (CLEA®) are commercially available for some of the more common enzymes.

Hence in one embodiment, the one or more enzymes are reacted with a bifunctional cross-linker so as to form enzyme aggregates.

Homo and hetero-bifunctional cross-linkers can be used to immobilise enzymes onto another activated material, such as a binder constituent. Hetero-bifunctional cross-linkers have the advantage of being selective in each end of the molecule. This ensures that the cross-linking only occurs between the molecules of interest. However, homo-bifunctional cross-linkers are also frequently used to immobilise enzymes onto a separate material. Immobilisation of enzymes may be performed before and after film curing, by either binding the enzyme to a precursor of the film or activating a cured film and binding the enzymes to the activated sites.

Also, modification of the surface of enzymes may improve their compatibility with solvents, such as oils or hydrophobic solvents. Poly(ethylene glycol) and fatty acids are commonly applied to render enzymes more compatible with the environments they are intended to be kept in.

Hence in one further embodiment, the enzyme is surface-modified, preferably with Poly(ethylene glycol).

If present, the one or more enzyme applied to prevent settlement of bio-fouling organisms on the polysiloxane-based fouling-release coating system should preferably constitute a maximum of 10 wt %, e.g. 0.0005-8 wt %, such as 0.001-6 wt %, or 0.002-4 wt %, or 0.003-2 wt %, or 0.005-1 wt %, or 0.01-0.1 wt %, of the total weight of the first coat, calculated as amount of pure enzyme compared to the total weight of the cured coating (dry weight).

As is apparent from the various aspects disclosed herein, whenever comprised in a composition, the enzyme is comprised in the first coat of the coating system disclosed herein. Consequently, in most embodiments, the second coat is devoid of any enzymes.

In an embodiment, the second coat of the coating system disclosed herein comprises enzyme but neither hydrophilic oligomer/polymer moieties nor hydrophilic-modified polysiloxane oil. In a particular embodiment thereof, the amount of enzyme comprised in the second coat is less than the amount of enzyme comprised in the first coat, such as less than 70%, e.g. less than 50%, or less than 25%.

Embodiments of the Cured First Coat

In one embodiment, the cured first coat comprises one or more hydrophilic-modified polysiloxane oils of the type specified for the cured second coat in the section "Hydrophilic modified polysiloxane oil". Preferably, the content of such hydrophilic polysiloxane oils (if present) are as specified for the cured second coat.

In another embodiment, the binder matrix of the cured first coat has included as a part thereof hydrophilic oligomer/polymer moieties as specified for the binder matrix of the cured second coat in the section "Hydrophilic modification of the binder matrix". Preferably, the content of such hydrophilic oligomer/polymer moieties (if present) are as specified for the cured second coat.

With respect to the two above-mentioned embodiments in the variant where the first coat comprises one or more biocides, the weight ratio between on the one hand the combined amount of the hydrophilic oligomer/polymer moieties of the binder matrix (if present; see below) and the one or more hydrophilic-modified polysiloxane oil(s) and on the other hand the one or more biocides is typically in the range of 1:0.02 to 1:50, or 1:0.05 to 1:20, or 1:0.06 to 1:16, or 1:0.08 to 1:14, or 1:0.1 to 1:12, even 1:0.15 to 1:10, or 1:0.05 to 1:9, or 1:0.1 to 1:8, or 1:0.2 to 1:7, or 1:0.08 to 1:12, or 1:0.1 to 1:10, even 1:0.15 to 1:6, or 1:0.1 to 1:5, or 1:0.2 to 1:4. In another embodiment, said ratio is typically in the range of 1:0.25 to 1:3.5, or 1:0.3 to 1:3, or 1:0.35 to 1:2.5, or 1:0.4 to 1:2, or 1:0.5 to 1.5. In one embodiment, the first coat comprises one or more biocides. In another embodiment, the first coat is devoid of biocide.

In another embodiment, the first coat comprises one or more enzymes. In another embodiment, said first coat is devoid of enzyme.

In still another embodiment, the first coat comprises one or more biocides as well as one or more enzymes.

In one embodiment, the first coat comprises:
40-98%, such as 60-95%, by dry weight of a polysiloxane-based binder matrix wherein more than 50% by weight of the binder matrix is represented by polysiloxane parts,
0.1-25%, such as 2-20%, by dry weight of one or more biocides,
0.1-15%, such as 1-10%, by dry weight of one or more additives, and
0-20%, such as 1-10%, by dry weight of one or more pigments and fillers.

In another embodiment, the first coat comprises:
40-98%, such as 60-95%, by dry weight of a polysiloxane-based binder matrix wherein more than 50% by weight of the binder matrix is represented by polysiloxane parts,
0.1-25%, such as 2-20%, by dry weight of one or more biocides,
0.1-15%, such as 1-10%, by dry weight of one or more additives,
0-20%, such as 1-10%, by dry weight of one or more pigments and fillers, and
0.5-20%, such as 1-15% by dry weight of one or more hydrophilic-modified polysiloxane oils.

In yet another embodiment, the first coat comprises:
40-98%, such as 60-95%, by dry weight of a polysiloxane-based binder matrix wherein more than 50% by weight of the binder matrix is represented by polysiloxane parts,
0.0001-5%, such as 0.001-2%, by dry weight of one or more enzymes,
0.1-15%, such as 1-10%, by dry weight of one or more additives, and
0-20%, such as 1-10% by dry weight of one or more pigments and fillers.

In still another embodiment, the first coat comprises:
40-98%, such as 60-95%, by dry weight of a polysiloxane-based binder matrix wherein more than 50% by weight of the binder matrix is represented by polysiloxane parts,
0.0001-5%, such as 0.001-2%, by dry weight of one or more enzymes,
0.1-15%, such as 1-10%, by dry weight of one or more additives, and
0-20%, such as 1-10% by dry weight of one or more pigments and fillers, and
0.5-20%, such as 1-15%, by dry weight of one or more hydrophilic-modified polysiloxane oils.

It should be understood that the expression "% dry weight" means the percentage of the respective component based on the dry weight of the coat or of the coating composition, as the case may be. For most practical purposes (hence, unless otherwise stated), the "% dry weight" when referring the cured coat is identical to the "% dry weight" of the coating composition.

The Cured Second Coat

The second coat comprises a polysiloxane-based binder matrix constituting at least 40% by dry weight of said second coat, and more than 50% by weight of the binder matrix is represented by polysiloxane parts. Often, this second coat constitutes the outermost layer of the fouling control coating system.

It has been found that within the first alternative aspect of the invention, the second coat should be relatively more hydrophilic compared to a "standard" polydimethylsiloxane (PDMS) (an example of a "standard" polydimethylsiloxane in terms of hydrophobicity/hydrophilicity is Xiameter PMX-200 Sil Fluid 5000 CST ex Dow Corning, United States), hence a feature of the second coat is that the hydrophilic properties are provide in any or both of the following ways: (i) that the binder matrix of said second coat has included as a part thereof hydrophilic oligomer/polymer moieties, and/or (ii) that the second coat further comprising one or more hydrophilic-modified polysiloxane oils. These two ways are further described in the sections "Hydrophilic modification of the binder matrix" and "Hydrophilic-modified polysiloxane oils", respectively, further below.

Hence, contrary to what should be believed, it is preferred that the equilibrium water contact angle of the cured second coat is in the range of 0° to 30°, such as 0° to 27°, e.g. in the range of 0° to 24°, or even in the range of 0° to 20° These ranges are particularly relevant where the second coat comprises a hydrophilic-modified polysiloxane oil. The equilibrium water contact angle is measured as described in the Examples section herein.

The surface energy of a cured second coat is relatively high if the equilibrium water contact angle is low, such as below 30°, such as below 24°, e.g. below 20° when measured at e.g. room temperature (23° C.). Accordingly, the critical surface tension of the coating compositions provided herein is relatively high, such as above 60 mN/m, e.g. above 65 mN/m, such as above 70 mN/m.

It should be understood that the second coat may either have included as a part of the binder matrix hydrophilic oligomer/polymer moieties, or the second coat may comprise one or more hydrophilic-modified polysiloxane oils, or the second coat may have included as a part of the binder matrix hydrophilic oligomer/polymer moieties and at the same time comprise one or more hydrophilic-modified polysiloxane oils.

Hydrophilic Modification of the Binder Matrix

In one variant, the binder matrix has included as a part thereof hydrophilic oligomer/polymer moieties. Any hydrophilic oligomer/polymer moieties preferably make up 1-30% by weight, such as 2-25% by weight, e.g. 1-20% by weight, of the binder matrix.

It should of course be understood that the hydrophilic oligomer/polymer moieties which are included in the polysiloxane-based binder matrix are of non-silicon origin.

In one embodiment, the binder includes a curable diorganopolysiloxane represented by a general formula (1) shown below:

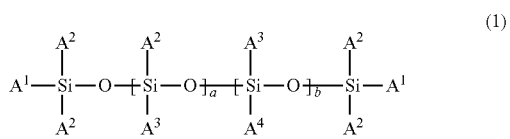

(1)

wherein each $A^1$ is independently selected from a hydroxyl group, a hydrolysable group and another functional group, such as amine or epoxy; each $A^2$ is independently selected from alkyl, aryl, alkenyl and a hydrolysable group; each $A^3$ and $A^4$ is independently selected from alkyl, aryl alkenyl and a hydrophilic group, such as a polyoxyalkylene group, wherein, if $A^3$ and/or $A^4$ is a hydrophilic group, such as a polyoxyalkylene group, such group may be attached to the silicon atom via a $C_{2-5}$-alkylene linker; a=1-25,000, b=1-2,500 and a+b is at least 5.

In one alternative embodiment, the binder includes a curable diorganopolysiloxane represented by a general formula (1x) shown below:

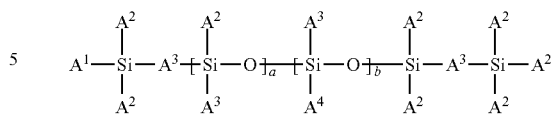

(1x)

wherein each of $A^1$, $A^2$, $A^3$, $A^4$, a and b are as above for formula (1) and wherein each $A^5$ is independently selected from oxygen or an alkyl group of 2-5 carbon atoms.

In another embodiment, the polysiloxane binder has hydrophilic oligomer/polymer moieties grafted as side chains (pendant hydrophilic groups), as depicted below, and can be prepared by a hydrosilylation reaction between a hydride functional polysiloxane and a hydrophilic component containing an unsaturated group (—CH=CH$_2$) such as for example an allyl or vinyl group, in presence of a hydrosilylation catalyst, such as platinum, in accordance with formula (1c), where the example of a hydrophilic compound is an allyl-terminated poly(ethylene glycol). The synthesis is carried out at elevated temperatures, such as 60-150° C. To render the polymer curable, it is necessary to functionalise it with a hydrolysable, or by other means reactive, group, such as vinyltrimethoxysilane. The reaction is following same principles as when grafting the hydrophilic compound to the polysiloxane, and it is outlined in formula (1b), and the functionalization may be done, but not necessarily, prior to the bonding of a hydrophilic group.

The resulting binder from the reaction (1b) is further modified with a hydrophilic component, for example poly(ethylene glycol) mono allyl ether as outlined in formula (1c) resulting in a curable, polysiloxane modified with hydrophilic oligomer/polymer moieties.

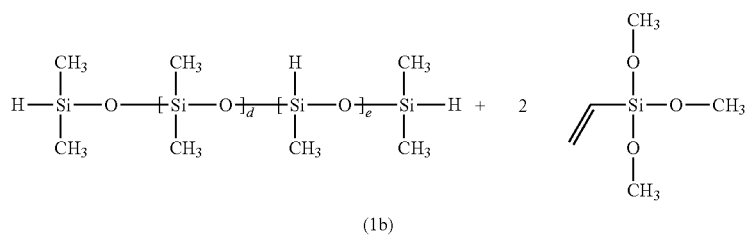

(1b)

platinum catalyst
60-150° C.

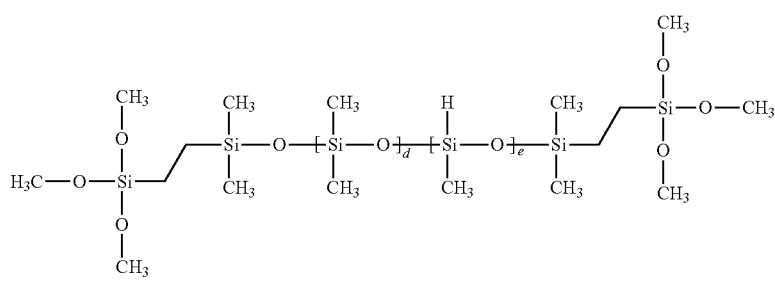

-continued

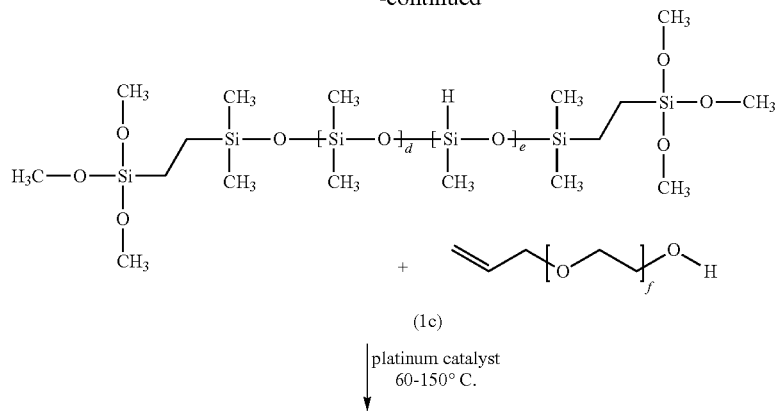

(1c)

platinum catalyst
60-150° C.

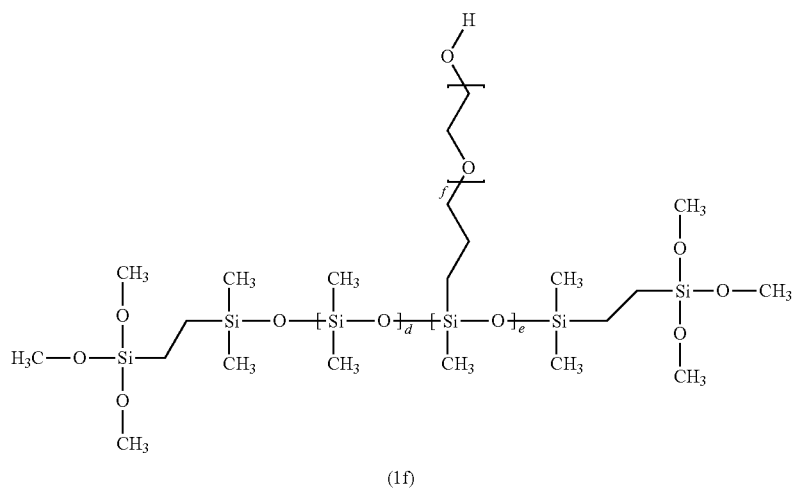

(1f)

The binder obtained can be used as it is, or in combination with a curable diorganosiloxane (of the generic type presented in formula 1). As previously described, hydrophilic polymers other than poly(ethylene glycol) are also useful for rendering the polysiloxane hydrophilic.

It is possible to graft the hydrophilic pendant moieties to the polysiloxane prior to grafting the hydrolysable silane to the polysiloxane (i.e. in reverse order than the synthesis described in formulae (1b) and (1c).

Hence, in one interesting embodiment, the cured paint coat comprising a polysiloxane-based binder matrix has included as a part thereof pendant hydrophilic oligomer/polymer moieties.

The expression "pendant" means that the hydrophilic oligomer/polymer moieties are attached to the polysiloxane backbone at a non-terminal position and that such moieties are attached at only the one end so that the pendant hydrophilic oligomer/polymer forms a "graft" to the polysiloxane backbone (matrix). This is can also be referred to as "branched".

Pendant hydrophilic oligomers/polymer moieties may in principle at the free end carry functional (non-reactive) groups at the free end, e.g. groups exhibiting a biocidal effect, etc. However, in most embodiments, the hydrophilic oligomers/polymer moieties are not carrying such functional groups, but are in the form of the native oligomer/polymer form, possibly end-capped, like with an alkyl group, or possibly with a hydroxyl group or methoxy terminated.

Another variation of the binder is an A-B-A copolymer of polysiloxane (A) and a hydrophilic polymer (B), such as poly(oxyalkylene). An example of the structure of the polymer is depicted in formula (1d). In this variation, units of a polymer with hydrophilic character, such as polyoxyalkylene are introduced in the backbone of the polysiloxane to form an alternating block copolymer. Introducing hydrophilic groups such as oxyalkylene groups in the binder may increase the hydrophilicity of the binder as described in reference WO 2008/132196. The binders can be used alone or in combination, and the structure of the copolymer can be A-B-A and B-A-B. In case of B-A-B, a pendant curable functionality is required, since the terminal groups of the silicone portion would be blocked by the hydrophilic polymer.

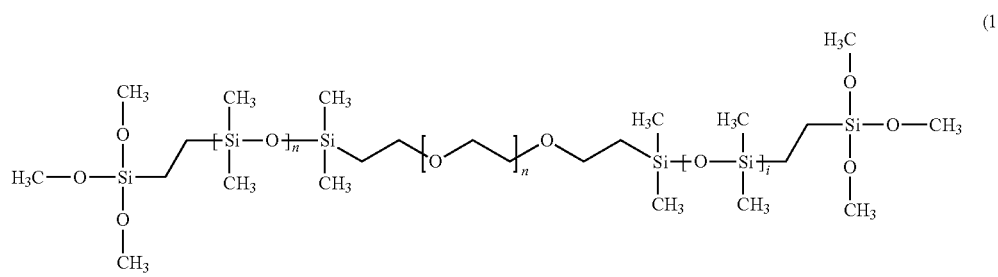
(1d)

In yet another variant, the hydrophilic component is obtained by hydrosilylation of a polyoxyalkylene compound containing at least one, unsaturated group (—CH═CH$_2$) such as an allyl or a vinyl group, with a silane having a hydride group, e.g. HSi(R*)$_3$ groups, wherein each R* independently is selected from C$_{1-4}$-alkyl and C$_{1-4}$-alkoxy (e.g. methyl, ethyl, propyl, butyl, methoxy, ethoxy, propoxy, and butoxy), at least one being C$_{1-4}$-alkoxy, such as for example trimethoxysilane, triethoxysilane or methyldimethoxysilane, in the presence of a hydrosilylation catalyst, such as platinum, yielding a curable poly(oxyalkylene). The reaction is carried out at elevated temperatures, such as 60-150° C. The synthesis is outlined in formula (1e). The polymer has to be used in combination with, e.g., component (i) (formula 1). Further examples of useful silanes include, without being limited to, triethoxysilane, tripropoxysilane, tert-butyldiethoxysilane.

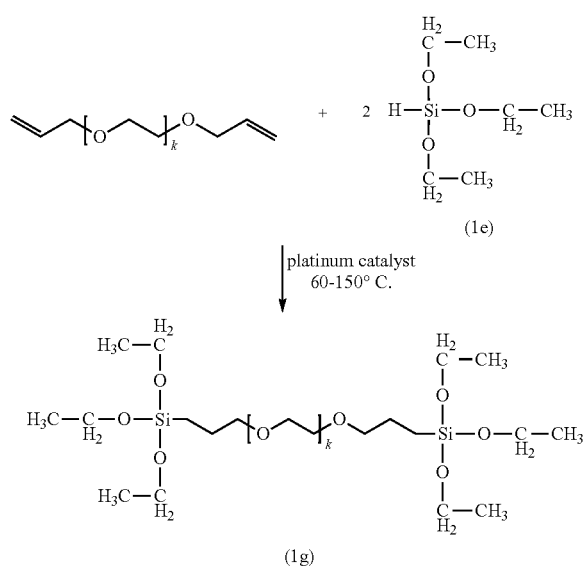
(1e)

In one variant, the hydrophilicity may be obtained (or added to the hydrophilicity which may have been obtained by incorporating a hydrophilic group to binder (i) as outlined in previous section), by using a hydrophilic silane, such as the generic type expressed in formula (2a).

The hydrophilic silane will react with the silanol or the hydrolysable groups in the binder component (formulae (1) or (1e)), and thereby incorporate a hydrophilic component.

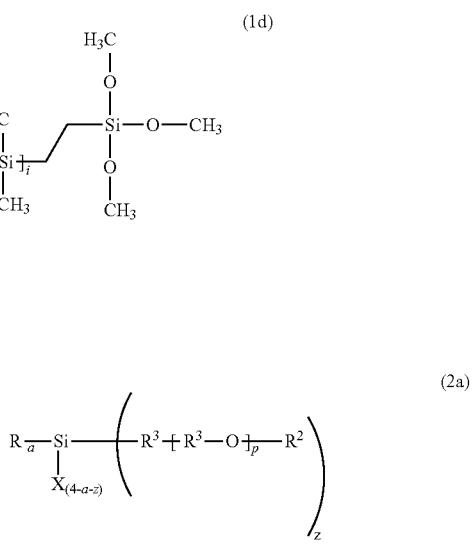
(2a)

wherein,
each R represents, independently, an unsubstituted or substituted monovalent hydrocarbon group of 1 to 6 carbon atoms or a hydrolysable group,
each X represents, independently, a hydrolysable group,
each R$^2$ is independently selected from —H, C$_{1-4}$-alkyl (e.g. —CH$_3$, —CH$_2$CH$_3$, —CH$_2$CH$_2$CH$_3$, —CH(CH$_3$)$_2$, —CH$_2$CH$_2$CH$_2$CH$_3$), phenyl (—C$_6$H$_5$), and C$_{1-4}$-alkylcarbonyl (e.g. —C(═O)CH$_3$, —C(═O)CH$_2$CH$_3$ and —C(═O)CH$_2$CH$_2$CH$_3$), in particular —H and methyl;
each R$^3$ is independently selected from C$_{2-5}$-alkylene (e.g. —CH$_2$CH$_2$—, —CH$_2$CH(CH$_3$)—, —CH$_2$CH$_2$CH$_2$—, —CH$_2$CH$_2$CH$_2$CH$_2$—, —CH$_2$CH(CH$_2$CH$_3$)—), arylene (e.g. 1,4-phenylene) and C$_{2-5}$-alkylene substituted with aryl (e.g. 1-phenyl ethylene), in particular from C$_{2-5}$-alkylene such as —CH$_2$CH$_2$— and —CH$_2$CH(CH$_3$)—);
p is 0-50;
a is 0-2;
z is 1-3.

Introducing oxyalkylene units in the organopolysiloxane will increase the hydrophilicity of the binder, especially when ethyleneoxide type —[CH$_2$CH$_2$—O]— is used.

In a further embodiment, the hydrophilic modification of the binder consists of both A-B-A modifications (as described above) and of pendant hydrophilic oligomer/polymer moieties.

It should be understood that the hydrophilic oligomer/polymer moieties forms a part of the polysiloxane-based binder matrix, i.e. that the moieties are covalently incorporated into the binder matrix. It should also be understood that the formed covalent bond(s) preferably are non-hydrolysable.

It should of course be understood that the hydrophilic oligomer/polymer moieties which are included in the polysiloxane-based binder matrix are of non-silicon origin.

Suitable hydrophilic oligomer/polymer moieties are those selected from poly(vinyl pyrrolidone), poly[N-(2-hydroxypropyl)methacrylamide], poly(N,N-dimethacrylamide), poly(acrylic acid), poly(glycerol), polyHEMA, polysaccharides, poly(vinyl alcohol), polyketones, poly(aldehyde guluronate), polyvinylamine, polycaprolactones, poly(vinyl acetate), polyoxyalkylenes like poly(ethylene glycol), poly (propylene glycol), poly(2-methyl-2-oxazoline), etc., including copolymers of the foregoing. Preferably the hydrophilicity is obtained by modification with polyoxyalkylene moieties.

Incorporation of the above mentioned hydrophilic oligomer/polymer into the polysiloxane polymer backbone is typically done through a linking group. The linking group is understood as the product of the reaction of two mutually reaction functional groups; one functional group on the polysiloxane backbone and one on the hydrophilic oligomer/polymer. E.g. an amine linking group is result of for example—but not exclusively—the reaction of a glycidyl ether with a primary or secondary amine. Examples of useful linking groups between the hydrophilic oligomer/polymer and the polysiloxane backbone are: amine groups, ether groups, amide groups. 1,2,3-triazole, C—C bonds, C=C double bonds, C—C triple bonds, Si—C bonds, C—S bonds, S—S bonds, urethane group, urea groups. Most preferred linking group is the Si—C bond prepared by hydrosilylation reaction catalyzed by platinum where the functional group on the polysiloxane backbone is a hydride and the functional group on the hydrophilic oligomer/polymer is an allyl group.

In some embodiments, it is preferred that the hydrophilic oligomer/polymer moieties provide a permanent hydrophilic contribution to the binder matrix. Hence, in such embodiments, the hydrophilic oligomer/polymer moieties are preferably devoid of any bonds which are hydrolysable in sea-water. Hence, preferably, the hydrophilic oligomer/polymer moieties do not include ester bonds or acid anhydride bonds.

In the present context oligomer/polymer moieties are understood as those encompassing at least 3 repeating units, such as at least 5 repeating units. Typically, oligomer/polymer moieties used for modification include 3-1,000 repeating units, such as 3-200, or 5-150, or 5-100, or 10-80, or 5-20, repeating units.

In some preferred embodiments, the hydrophilic oligomer/polymer moieties (i.e. oligomeric or polymeric groups incorporated into the binder matrix) have a number average molecular weight ($M_n$) in the range of 100-50,000 g/mol, such as in the range of 100-30,000 g/mol, in particular in the range of 150-20,000 g/mol, or in the range of 200-10,000 g/mol.

In the present description with claims, the terms "hydrophilic oligomer/polymer moieties", "hydrophilic polymer moieties", and similar are intended to mean that the oligomeric or polymeric moieties, in themselves (i.e. when represented as discrete molecules) have a solubility of at least 1% (w/w) in demineralized water at 25° C.

When the polysiloxane-based binder system discussed above is characterized by having included therein, as a part of the binder matrix, one or more polysiloxane components which are modified with hydrophilic oligomer/polymer moieties, such polysiloxane components will upon reaction with other polysiloxane components and cross-linkers provide hydrophilic properties to the binder system. Alternatively, hydrophilic oligomer/polymer moieties functionalized with reactive silanes which enable them to react with the polysiloxane binder, or the hydrophilic oligomer/polymer moieties, and form a non-hydrolysable bond, may also be used.

The polysiloxane components must include silicon-reactive groups such as Si—OH groups, hydrolysable groups such as Si—OR (such as alkoxy, oxime, acetoxy etc.) groups, etc., so as to facilitate reaction with other constituents of the polysiloxane-based binder system.

In one currently preferred embodiment of the above, the hydrophilic oligomer/polymer moiety is a poly(oxyalkylene) moiety.

Hydrophilic-Modified Polysiloxane Oils

In another variant (which may be combined with the first variant referred to in the paragraph concerning 'Hydrophilic modification of the binder matrix' outlined hereinabove), the second coat may further include hydrophilic-modified polysiloxane oils, i.e. constituents which do not form covalent bonds to the polysiloxane-based binder matrix. Hydrophilic-modified polysiloxane oils are widely used as surfactants and emulsifiers due to the content of both hydrophilic and lipophilic groups in the same molecule. In contrast to the polysiloxane components discussed above, the hydrophilic-modified polysiloxane oils are selected so that they do not contain groups that can react with the binder (or binder components) or the cross-linker (if present), hence the hydrophilic-modified polysiloxane oils are intended to be non-reactive, in particular with respect to the binder components. In particular, the hydrophilic-modified polysiloxane oils are devoid of any silicon-reactive groups such as Si—OH groups, hydrolysable groups such as Si—OR (such as alkoxy, oxime, acetoxy etc.) groups, etc., so as to avoid reaction with constituents of the polysiloxane-based binder system.

The non-reactive hydrophilic-modified polysiloxane oils are typically modified by the addition of non-ionic oligomeric or polymeric groups which can be polar and/or capable of hydrogen bonding, enhancing their interaction with polar solvents, in particular with water, or with other polar oligomeric or polymeric groups. Examples of these groups include, amides (e.g. poly(vinyl pyrrolidone), poly[N-(2-hydroxypropyl)methacrylamide]), poly(N,N-dimethacrylamide), acids (e.g. poly(acrylic acid)), alcohols (e.g. poly(glycerol), polyHEMA, polysaccharides, poly(vinyl alcohol)), ketones (polyketones), aldehydes (e.g. poly(aldehyde guluronate), amines (e.g. polyvinylamine), esters (e.g. polycaprolactones, poly(vinyl acetate)), ethers (e.g. polyoxyalkylenes like poly(ethylene glycol), poly(propylene glycol)), imides (e.g. poly(2-methyl-2-oxazoline)), etc., including copolymers of the foregoing. Preferably the hydrophilicity is obtained by modification with polyoxyalkylene groups.

In a preferred embodiment the groups are selected from ethers (e.g. polyoxyalkylenes like poly(ethylene glycol), poly(propylene glycol)), imides (e.g. poly(2-methyl-2-oxazoline)).

As before, it should be understood that the hydrophilic oligomer/polymer moieties with which the polysiloxane oils are modified are of non-silicon origin. Preferably, the above-mentioned "oligomers" and "polymers" include at least 3 repeating units, such as at least 5 repeating units. In many interesting embodiments, the oligomers or polymers include 3-1,000 repeating units, such as 3-200, or 5-150, or 5-100 repeating units. In another interesting embodiment the oligomers or polymers include 3-30 repeating units, such as 3-20 repeating units, such as 3 to 15 or even 4 to 12 repeating units. In yet another interesting embodiment the oligomers or polymers include 6 to 20 repeating units, such as 8 to 15 repeating units.

In some preferred embodiments, the hydrophilic groups (i.e. oligomeric or polymeric groups) have a number average molecular weight ($M_n$) in the range of 100-50,000 g/mol, such as in the range of 100-30,000 g/mol, in particular in the range of 200-20,000 g/mol, or in the range of 200-10,000 g/mol.

In other interesting embodiments the hydrophilic groups have a number average molecular weight ($M_n$) in the range of 200-5,000 g/mol, such as 200-2,500 g/mol or even 300-1,000 g/mol.

In the present description with claims, the term "hydrophilic-modified" in the context of "hydrophilic-modified polysiloxane oil" is intended to mean that the oligomeric or polymeric groups with which the polysiloxane is modified, in themselves (i.e. as discrete molecules) have a solubility of at least 1% (w/w) in demineralized water at 25° C.

Of particular interest are those hydrophilic-modified polysiloxane oils in which the relative weight of the hydrophilic moieties is 1% or more of the total weight (e.g. 1-90%), such as 5% or more (e.g. 5-80%), in particular 10% or more (e.g. 10-70%) of the total weight of the hydrophilic-modified polysiloxane oil.

In one embodiment the relative weight of the hydrophilic moieties is in the range of 25-60% such as 30-50% of the total weight of the hydrophilic-modified polysiloxane oil.

In a preferred embodiment, the hydrophilic-modified polysiloxane oil (if present) has a number average molecular weight ($M_n$) in the range of 100-100,000 g/mol, such as in the range of 250-75,000 g/mol, in particular in the range of 500-50,000 g/mol.

In another preferred embodiment, the hydrophilic-modified polysiloxane oil (if present) has a number average molecular weight ($M_n$) in the range of 500-20,000 g/mol, such as 1,000-10,000 g/mol, or 1,000-7,500 g/mol, or even 1,500-5,000 g/mol.

It is also preferred if the hydrophilic-modified polysiloxane oils (if present) have a viscosity in the range of 10-20,000 mPa·s, such as in the range of 20-10,000 mPa·s, in particular in the range of 40-5,000 mPa'S.

The hydrophilic-modified polysiloxane oils may be utilized to control the accessibility of the one or more enzymes and/or to control the leaching of any biocides, as well as to distribute the enzyme in the wet paint.

In one currently preferred embodiment, the hydrophilic-modified polysiloxane oil is a poly(oxyalkylene)-modified polysiloxane.

In one variant hereof, the poly(oxyalkylene)-modified polysiloxane oil is a polysiloxane having grafted thereto poly(oxyalkylene) chains. An illustrative example of the structure of such hydrophilic-modified polysiloxane oils is formula (A):

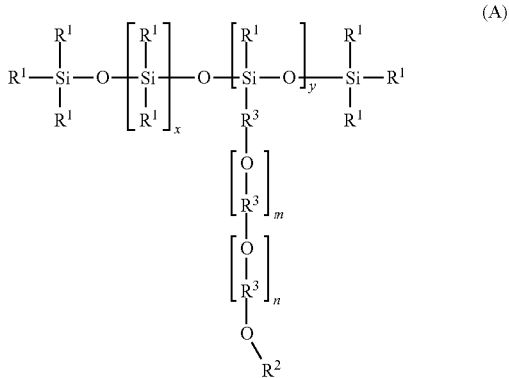

(A)

wherein
each $R^1$ is independently selected from $C_{1-5}$-alkyl (including linear or branched hydrocarbon groups) and aryl (e.g. phenyl ($-C_6H_5$)), in particular methyl;

each $R^2$ is independently selected from $-H$, $C_{1-4}$-alkyl (e.g. $-CH_3$, $-CH_2CH_3$, $-CH_2CH_2CH_3$, $-CH(CH_3)_2$, $-CH_2CH_2CH_2CH_3$), phenyl ($-C_6H_5$), and $C_{1-4}$-alkylcarbonyl (e.g. $-C(=O)CH_3$, $-C(=O)CH_2CH_3$ and $-C(=O)CH_2CH_2CH_3$), in particular $-H$ and methyl;

each $R^3$ is independently selected from $C_{2-5}$-alkylene (e.g. $-CH_2CH_2-$, $-CH_2CH(CH_3)-$, $-CH_2CH_2CH_2-$, $-CH_2CH_2CH_2CH_2-$, $-CH_2CH(CH_2CH_3)-$), arylene (e.g. 1,4-phenylene) and $C_{2-5}$-alkylene substituted with aryl (e.g. 1-phenyl ethylene), in particular from $C_{2-5}$-alkylene such as $-CH_2CH_2-$ and $-CH_2CH(CH_3)-$);

x is 0-2500, y is 1-100 and x+y is 1-2000;
and n is 0-50, m is 0-50 and m+n is 1-50.

In one specific embodiment of formula (A) hereinabove, x+y is less than 25 such as less than 20, or less than 15. In another specific embodiment, x+y includes 3 to 30 repeating units, such as 3 to 20 repeating units, such as 3 to 15 or even 4 to 12 repeating units. In yet another interesting embodiment x+y includes 5 to 20 repeating units, such as 8 to 15 repeating units.

Commercially available hydrophilic-modified polysiloxane oils of this type are DC5103 (Dow Corning), DC Q2-5097 (Dow Corning), and DC193 (Dow Corning).

In another variant hereof, the poly(oxyalkylene)-modified polysiloxane oil is a polysiloxane having incorporated in the backbone thereof poly(oxyalkylene) chains. An illustrative example of the structure of such hydrophilic-modified polysiloxane oils is formula (B):

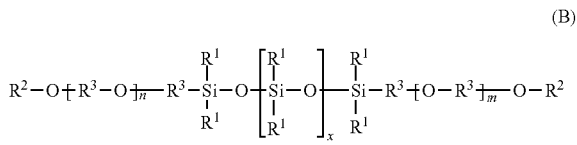

(B)

wherein
each $R^1$ is independently selected from $C_{1-5}$-alkyl (including linear or branched hydrocarbon groups) and aryl (e.g. phenyl ($-C_6H_5$)), in particular methyl; each $R^2$ is independently selected from $-H$, $C_{1-4}$-alkyl (e.g. $-CH_3$, $-CH_2CH_3$, $-CH_2CH_2CH_3$, $-CH(CH_3)_2$, $-CH_2CH_2CH_2CH_3$), phenyl ($-C_6H_5$), and $C_{1-4}$-alkylcarbonyl (e.g. $-C(=O)CH_3$, $-C(=O)CH_2CH_3$ and $-C(=O)CH_2CH_2CH_3$), in particular $-H$ and methyl;

each $R^3$ is independently selected from $C_{2-5}$-alkylene (e.g. $-CH_2CH_2-$, $-CH_2CH(CH_3)$, $-CH_2CH_2CH_2-$, $-CH_2CH_2CH_2CH_2-$, $-CH_2CH(CH_2CH_3)-$), arylene (e.g. 1,4-phenylene) and $C_{2-5}$-alkylene substituted with aryl (e.g. 1-phenyl ethylene), in particular from $C_{2-5}$-alkylene such as $-CH_2CH_2-$ and $-CH_2CH(CH_3)-$);

x is 0-2500; and
n is 0-50, m is 0-50 and m+n is 1-50.

In an embodiment of formula (B) herein above, n+m includes 3 to 30 repeating units, such as 3 to 20 repeating units, such as 3 to 15 or even 4 to 12 repeating units. In yet another interesting embodiment n+m includes 6 to 20 repeating units, such as 8 to 15 repeating units.

In an embodiment of formula (B) herein above, x includes 3 to 1,000 repeating units, such as 3 to 200, or 5 to 150, or 5 to 100, repeating units, e.g. 1 to 50 repeating units. In another interesting embodiment x includes 3 to 30 repeating units, such as 3 to 20 repeating units, such as 3 to 15, or even 4 to 12, repeating units. In yet another interesting embodiment x includes 6 to 20 repeating units, such as 8 to 15 repeating units.

In an embodiment of formula (B) herein above, n+m+x includes 3 to 30 repeating units, such as 3 to 20 repeating units, such as 3 to 15, or even 4 to 12, repeating units. In yet another interesting embodiment n+m+x includes 6 to 20 repeating units, e.g. 8 to 25 repeating units, such as 8 to 15 repeating units.

Commercially available hydro phi lie-modified polysiloxane oils of this type are DC Q4-3669 (Dow Corning), DC Q4-3667 (Dow Corning) and DC2-8692.

In still another variant hereof, the poly(oxyalkylene)-modified polysiloxane oil is a polysiloxane having incorporated in the backbone thereof polyoxyalkylene chains and having grafted thereto polyoxyalkylene chains. An illustrative example of the structure of such hydrophilic-modified polysiloxane oils is formula (C):

sometimes are referred to as poly(ethylene glycol), poly (propylene glycol) and poly(ethylene glycol-co-propylene glycol). Hence, in the above structures (A), (B) and (C), each $R^3$ linking two oxygen atoms is preferably selected from —$CH_2CH_2$— and —$CH_2CH(CH_3)$—, whereas each $R^3$ linking a silicon atom and an oxygen atom preferably is selected from $C_{2-5}$-alkyl.

It should be understood that the one or more non-reactive hydrophilic-modified polysiloxane oils, if present, may be of different types, e.g. two or more of the types described above.

In an embodiment of formula (C) herein above, n+m includes 3 to 30 repeating units, such as 3 to 20 repeating units, such as 3 to 15, or even 4 to 12, repeating units. In yet another interesting embodiment n+m includes 6 to 20 repeating units, such as 8 to 15 repeating units.

In an embodiment of formula (C) herein above, x includes 3 to 1,000 repeating units, such as 3 to 200, or 5 to 150, or 5 to 100 repeating units, e.g. 1 to 50 repeating units. In

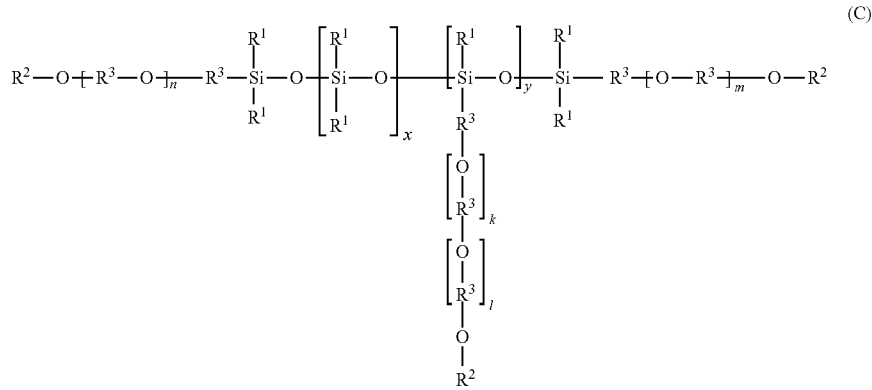

(C)

wherein:
- each $R^1$ is independently selected from $C_{1-5}$-alkyl (including linear or branched hydrocarbon groups) and aryl (e.g. phenyl (—$C_6H_5$)), in particular methyl;
- each $R^2$ is independently selected from —H, $C_{1-4}$-alkyl (e.g. —$CH_3$, —$CH_2CH_3$, —$CH_2CH_2CH_3$, —$CH(CH_3)_2$, —$CH_2CH_2CH_2CH_3$), phenyl (—$C_6H_5$), and $C_{1-4}$-alkylcarbonyl (e.g. —C(=O)$CH_3$, —C(=O)$CH_2CH_3$ and —C(=O)$CH_2CH_2CH_3$), in particular —H and methyl;
- each $R^3$ is independently selected from $C_{2-5}$-alkylene (e.g. —$CH_2CH_2$—, —$CH_2CH(CH_3)$—, —$CH_2CH_2CH_2$—, —$CH_2CH_2CH_2CH_2$—, —$CH_2CH(CH_2CH_3)$—), arylene (e.g. 1,4-phenylene) and $C_{2-5}$-alkylene substituted with aryl (e.g. 1-phenyl ethylene), in particular from $C_{2-5}$-alkylene such as —$CH_2CH_2$— and —$CH_2CH(CH_3)$—);
- x is 0-2500, y is 1-100 and x+y is 1-2000;
- k is 0-50, l is 0-50 and k+l is 1-50; and
- n is 0-50, m is 0-50 and m+n is 1-50.

In the above structures (A), (B) and (C), the groups —$CH_2CH(CH_3)$—, —$CH_2CH(CH_2CH_3)$—, etc. may be present in any of the two possible orientations. Similarly, it should be understood that the segments present x and y times typically are randomly distributed, or distributed as blocks, within the polysiloxane structure.

In these embodiments and variants, the poly(oxyalkylene) is preferably selected from polyoxyethylene, polyoxypropylene and poly(oxyethylene-co-oxypropylene), which another interesting embodiment x includes 3 to 30 repeating units, such as 3 to 20 repeating units, such as 3 to 15, or even 4 to 12, repeating units. In yet another interesting embodiment x includes 6 to 20 repeating units, such as 8 to 15 repeating units.

In an embodiment of formula (C) herein above, y includes 3 to 1,000 repeating units, such as 3 to 200, or 5 to 150, or 5 to 100 repeating units, e.g. 1 to 50 repeating units. In another interesting embodiment y includes 3 to 30 repeating units, such as 3 to 20 repeating units, such as 3 to 15, or even 4 to 12, repeating units. In yet another interesting embodiment y includes 6 to 20 repeating units, such as 8 to 15 repeating units.

In further embodiments, the hydrophilic-modified polysiloxane oils are devoid of fluorinated polymer or oligomer.

In a particular embodiment, the non-reactive hydrophilic-modified polysiloxane oils according to the invention are devoid of aromatic substituents.

If present, the one or more hydrophilic-modified polysiloxane oils are typically included in the coating composition (and in the cured coat) in an amount of 0.01-20%, e.g. 0.05-10%, by dry weight. In certain embodiments, the one or more hydrophilic-modified polysiloxane oils constitutes 0.05-7% by dry weight, e.g. 0.1-5% by dry weight, in particular 0.5-3% by dry weight, of the coating composition/cured coat. In certain other embodiments, the one or more hydrophilic-modified polysiloxane oils constitutes 1-10% by dry weight, e.g. 2-9% by dry weight, in particular 2-7% by dry weight, or 3-7% by dry weight, or 3-5% by dry weight, or 4-8% by dry weight, of the coating composition/cured coat.

Embodiments of the Cured Second Coat

In one interesting embodiment, the cured second coat comprises a polysiloxane-based binder matrix which has included as a part thereof pendant hydrophilic oligomer/polymer moieties.

In a further embodiment, the second coat comprises a polysiloxane-based binder matrix which include 5-45%, such as 10-40%, or 15-40%, or even 20-35%, by weight of hydrophilic oligomer/polymer moieties, e.g. pendant hydrophilic oligomer/polymer moieties. Preferably such hydrophilic oligomer/polymer moieties are polyoxyalkylene groups.

If present, the one or more hydrophilic-modified polysiloxane oils are typically included in the cured coat in an amount of 0.01-20%, e.g. 0.05-10%, by dry weight. In certain embodiments, the one or more hydrophilic-modified polysiloxane oils constitute 0.05-7% by dry weight, e.g. 0.1-5% by dry weight, in particular 0.5-3% by dry weight, of the coating composition/cured coat.

In another interesting embodiment, the cured second coat comprises one or more hydrophilic-modified polysiloxane oils in an amount of 0.5-20% by dry weight, such as 1-15%, or 2-10%, or 2-7%, by dry weight of the cured second coat.

In one embodiment, the cured second coat may have included therein one or more active ingredients selected from biocides and enzymes, i.e. of the type described for the first coat above.

In a further embodiment, possibly to be combined with the foregoing embodiments, the binder matrix of the second coat has included as a part thereof hydrophilic oligomer/polymer moieties, and the second coat further comprising one or more hydrophilic-modified polysiloxane oils.

So in one embodiment the second coat comprises:
40-98%, such as 60-95%, by dry weight of a polysiloxane-based binder matrix wherein more than 50% by weight of the binder matrix is represented by polysiloxane parts,
0.1-20%, such as 1-10%, by dry weight of one or more additives,
0-25%, such as 0.1-15%, by dry weight of one or more pigments and fillers, and
0.1-20%, such as 1-15%, by dry weight of one or more hydrophilic-modified polysiloxane oils.

In another embodiment the second coat comprises:
40-98%, such as 60-95%, by dry weight of a polysiloxane-based binder matrix wherein more than 50% by weight of the binder matrix is represented by polysiloxane parts, said binder matrix having included as a part thereof pendant hydrophilic oligomer/polymer moieties,
0.1-20%, such as 1-10%, by dry weight of one or more additives, and
0-25%, such as 0.1-15%, by dry weight of one or more pigments and fillers.

In yet another embodiment the second coat comprises:
40-98%, such as 60-95%, by dry weight of a polysiloxane-based binder matrix wherein 5-45%, such as 10-40% or 15-40% or even 20-35%, by weight of the binder matrix is represented by hydrophilic oligomer/polymer moieties,
0.1-20%, such as 1-10%, by dry weight of one or more additives,
0-20%, such as 0.1-15%, by dry weight of one or more pigments and fillers, and
0.1-20%, such as 1-15%, by dry weight of one or more hydrophilic-modified polysiloxane oils.

In one variant thereof, the binder matrix has included as a part thereof pendant hydrophilic oligomer/polymer moieties.

Preparation of Coating Composition

The first coat and the second coat are prepared from corresponding coating compositions, i.e. a first coating composition and a second coating composition.

Each of such coating compositions may be prepared by any suitable technique that is commonly used within the field of paint production. Thus, the various constituents may be mixed together utilizing a mixer, a high speed disperser, a ball mill, a pearl mill, a grinder, a three-roll mill etc. The coating compositions are typically prepared and shipped as two- or three-component systems that should be combined and thoroughly mixed immediately prior to use. The paints according to the invention may be filtrated using bag filters, patron filters, wire gap filters, wedge wire filters, metal edge filters, EGLM turnoclean filters (ex. Cuno), DELTA strain filters (ex. Cuno), and Jenag Strainer filters (ex. Jenag), or by vibration filtration. An example of a suitable preparation method is described in the Examples.

If present, any enzymes are preferably mixed with other paint constituents at a very late stage of the formulation process, such as after grinding and activation of thixotropic agents. Caution must be taken to keep temperatures relatively low, the lower the better, and—if at all necessary—only subject the formulation to elevated temperatures for as short time as possible. In one embodiment, the enzymes are added shortly before application.

The coating composition to be used in the method of the invention is typically prepared by mixing two or more components e.g. two pre-mixtures, one pre-mixture comprising the one or more reactive polysiloxane binders and one pre-mixture comprising the one or more cross-linking agents. It should be understood that when reference is made to the coating composition, it is the mixed coating composition ready to be applied. Furthermore, all amounts stated as % by dry weight of the coating composition should be understood as % by dry weight of the mixed paint composition ready to be applied, i.e. the weight apart from the solvents (if any).

Second Alternative Aspect of the Invention

The invention further relates to a fouling control coating system comprising at least a cured first coat and a cured second coat,
a) said first coat comprising a polysiloxane-based binder matrix constituting at least 40% by dry weight of said first coat, and more than 50% by weight of the binder matrix being represented by polysiloxane parts, said first coat further comprising one or more active ingredients selected from biocides and enzymes;
b) said binder matrix of said first coat having included as a part thereof hydrophilic oligomer/polymer moieties, and/or said first coat further comprising one or more hydrophilic-modified polysiloxane oils; and
c) said second coat comprising a polysiloxane-based binder matrix constituting at least 40% by dry weight of said second coat, and more than 50% by weight of the binder matrix being represented by polysiloxane parts.

All details with respect to the polysiloxane-based binder matrix of the first coat and the second coat, as with all details with respect to binder matrix, biocides, enzymes, hydrophilic-modified polysiloxane oils, any catalysts, any solvents, additives, pigments and fillers, etc. as well as suitable preparation methods are as disclosed further above. It should, however, be noted that the second coat within the second alternative aspect of the invention does not need to be particularly hydrophilic.

For the details concerning the feature that the binder matrix of the first coat has included as a part thereof hydrophilic oligomer/polymer moieties, see above under the section "Hydrophilic modification of the binder matrix".

For the details concerning the feature that the first coat further comprises one or more hydrophilic-modified polysiloxane oils, see above under the section "Hydrophilic modified polysiloxane oils".

In one variant, the one or more active ingredients include one or more biocides.

In another variant, the one or more active ingredients include one or more enzymes.

Third Alternative Aspect of the Invention

The invention further relates to a fouling control coating system comprising at least a cured first coat and a cured second coat,
- a) said first coat comprising a polysiloxane-based binder matrix constituting at least 40% by dry weight of said first coat, and more than 50% by weight of the binder matrix being represented by polysiloxane parts, said first coat further comprising one or more enzymes; and
- b) said second coat comprising a polysiloxane-based binder matrix constituting at least 40% by dry weight of said second coat, and more than 50% by weight of the binder matrix being represented by polysiloxane parts.

In one embodiment, the first coat further comprising one or more hydrophilic-modified polysiloxane oils (see above under the section "Hydrophilic modified polysiloxane oils").

In another embodiment, the binder matrix of the first coat has included as a part thereof hydrophilic oligomer/polymer moieties (see above under the section "Hydrophilic modification of the binder matrix").

Hence, the present invention also provides a coating composition for establishing the cured first coat, said composition comprises a polysiloxane-based binder matrix, one or more catalysts, one or more ingredients selected from solvents, additives, pigments and fillers, one or more enzyme, and hydrophilic-modified polysiloxane oil and/or hydrophilic oligomer/polymer moieties included in the binder matrix.

The present invention further provides a coating composition for establishing the cured first coat, said composition comprises a polysiloxane-based binder matrix, one or more catalysts, one or more ingredients selected from solvents, additives, pigments and fillers, and one or more enzyme, but wherein the coating composition is devoid of any hydrophilic-modified polysiloxane oils and/or hydrophilic oligomer/polymer moieties included in the binder matrix.

The details of the constituents of the coating compositions are described further above.

All details with respect to the polysiloxane-based binder matrix of the first coat and the second coat, as with all details with respect to the binder matrix, enzymes, hydrophilic-modified polysiloxane oils, any catalysts, any solvents, additives, pigments and fillers, etc. as well as suitable preparation methods are as disclosed further above. It should, however, be noted that the second coat within the second alternative aspect of the invention does not need to be particularly hydrophilic.

In one variant, the first coat further includes one or more biocides. For details regarding the type and content of any biocides, see further above in the section "The first cured coat", "Biocides".

Specific Embodiments of the Invention

Beside the general aspects of the invention, the invention also relates to the following specific embodiments:

Variants of the First Alternative Aspect of the Invention

Inclusion of biocides in the first coat and hydrophilic-modified polysiloxane oils in the subsequent coat(s) is believed to improve the resistance towards bio-fouling of said fouling control system compared to a system where the second coat does not contain hydrophilic oils. Without being bound to any particular theory, it is believed that the hydrophilic-modified polysiloxane oils in the outermost coating layer will mobilise the biocides during diffusion through the outermost layer.

A fouling control coating system comprising at least a cured first coat and a cured second coat,
- a) said first coat comprising a polysiloxane-based binder matrix constituting at least 40% by dry weight of said first coat, and more than 50% by weight of the binder matrix being represented by polysiloxane parts, said first coat further comprising one or more biocides; and
- b) said second coat comprising a polysiloxane-based binder matrix constituting at least 40% by dry weight of said second coat, and more than 50% by weight of the binder matrix being represented by polysiloxane parts, said second coat further comprising one or more hydrophilic-modified polysiloxane oils; wherein the equilibrium water contact angle of the cured second coat is in the range of 0° to 27°.

Within this embodiment, it is preferred that the cured second coat comprises one or more hydrophilic-modified polysiloxane oils in an amount of 0.5-20% by dry weight, such as 1-15%, or 2-10%, or 2-7%, by dry weight of the cured second coat.

Inclusion of biocides in the first coat and binders with hydrophilic-modified moieties in the subsequent coat(s) is believed to improve the resistance towards bio-fouling of said fouling control system compared to a system where the second coat does not contain hydrophilic-modified binder-moieties. Without being bound to any particular theory, it is believed that the hydrophilic-modified binder moieties in the outermost coating layer will mobilise the biocides during diffusion through the outermost layer.

A fouling control coating system comprising at least a cured first coat and a cured second coat,
- a) said first coat comprising a polysiloxane-based binder matrix constituting at least 40% by dry weight of said first coat, and more than 50% by weight of the binder matrix being represented by polysiloxane parts, said first coat further comprising one or more biocides; and
- b) said second coat comprising a polysiloxane-based binder matrix constituting at least 40% by dry weight of said second coat, and more than 50% by weight of the binder matrix being represented by polysiloxane parts, said binder matrix of said second coat having included as a part thereof hydrophilic oligomer/polymer moieties; wherein the equilibrium water contact angle of the cured second coat is in the range of 0° to 27°.

With this embodiment, it is preferred that the binder matrix of said second coat has included as a part thereof pendant hydrophilic oligomer/polymer moieties, in particular polyoxyalkylene moieties, such as polyoxyethylene moieties. Further, with respect to the amount of pendant hydrophilic oligomer/polymer moieties it is preferred that the polysiloxane-based binder matrix include 5-45%, such as 10-40%, or 15-40%, or even 20-35%, by weight of pendant hydrophilic oligomer/polymer moieties, in particular polyoxyethylene moieties.

Inclusion of enzymes in the first coat and hydrophilic-modified polysiloxane oils in the subsequent coat(s) is believed to improve the resistance towards bio-fouling of said fouling control system compared to a system where the second coat does not contain hydrophilic oils. Without being bound to any particular theory, it is believed that the hydrophilic-modified polysiloxane oils in the outermost coating layer will mobilise the enzymes during diffusion through the outermost layer.

A fouling control coating system comprising at least a cured first coat and a cured second coat,
  a) said first coat comprising a polysiloxane-based binder matrix constituting at least 40% by dry weight of said first coat, and more than 50% by weight of the binder matrix being represented by polysiloxane parts, said first coat further comprising one or more enzymes; and
  b) said second coat comprising a polysiloxane-based binder matrix constituting at least 40% by dry weight of said second coat, and more than 50% by weight of the binder matrix being represented by polysiloxane parts, said second coat further comprising one or more hydrophilic-modified polysiloxane oils; wherein the equilibrium water contact angle of the cured second coat is in the range of 0° to 27°.

Within this embodiment, it is preferred that the cured second coat comprises one or more hydrophilic-modified polysiloxane oils in an amount of 0.5-20% by dry weight, such as 1-15%, or 2-10%, or 2-7%, by dry weight of the cured second coat.

Inclusion of enzymes in the first coat and binders with hydrophilic-modified moieties in the subsequent coat(s) is believed to improve the resistance towards bio-fouling of said fouling control system compared to a system where the second coat does not contain hydrophilic-modified binder-moieties. Without being bound to any particular theory, it is believed that the hydrophilic-modified binder moieties in the outermost coating layer will mobilise the enzymes during diffusion through the outermost layer.

A fouling control coating system comprising at least a cured first coat and a cured second coat,
  a) said first coat comprising a polysiloxane-based binder matrix constituting at least 40% by dry weight of said first coat, and more than 50% by weight of the binder matrix being represented by polysiloxane parts, said first coat further comprising one or more enzymes; and
  b) said second coat comprising a polysiloxane-based binder matrix constituting at least 40% by dry weight of said second coat, and more than 50% by weight of the binder matrix being represented by polysiloxane parts, said binder matrix of said second coat having included as a part thereof hydrophilic oligomer/polymer moieties; wherein the equilibrium water contact angle of the cured second coat is in the range of 0° to 27°.

With this embodiment, it is preferred that the binder matrix of said second coat has included as a part thereof pendant hydrophilic oligomer/polymer moieties, in particular polyoxyalkylene moieties, such as polyoxyethylene moieties. Further, with respect to the amount of pendant hydrophilic oligomer/polymer moieties it is preferred that the polysiloxane-based binder matrix include 5-45%, such as 10-40%, or 15-40%, or even 20-35%, by weight of pendant hydrophilic oligomer/polymer moieties, in particular polyoxyethylene moieties.

Variants of the Second Alternative Aspect of the Invention

Inclusion of biocides and (i) hydrophilic modification of the binder matrix and/or (ii) hydrophilic-modified polysiloxane oils in the first coat, while keeping the outer layer free, or substantially free of biocides and hydrophilic binder modification and/or hydrophilic-modified polysiloxane oils is believed to improve the resistance towards bio-fouling of said fouling control system compared to a system where the first layer does not include such a hydrophilic modification. Without being bound to any particular theory, it is believed that the hydrophilic modification of the binder matrix and/or hydrophilic-modified polysiloxane oils will aid the diffusion of the biocide in the first layer, thus keeping a constant release rate of biocide due to the diffusion being controlled by the outermost layer.

A fouling control coating system comprising at least a cured first coat and a cured second coat,
  a) said first coat comprising a polysiloxane-based binder matrix constituting at least 40% by dry weight of said first coat, and more than 50% by weight of the binder matrix being represented by polysiloxane parts, said first coat further comprising one or more biocides;
  b) said binder matrix of said first coat having included as a part thereof hydrophilic oligomer/polymer moieties, and/or said first coat further comprising one or more hydrophilic-modified polysiloxane oils; and
  c) said second coat comprising a polysiloxane-based binder matrix constituting at least 40% by dry weight of said second coat, and more than 50% by weight of the binder matrix being represented by polysiloxane parts.

Inclusion of enzymes and (i) hydrophilic modification of the binder matrix and/or (ii) hydrophilic-modified polysiloxane oils in the first coat, while keeping the outer layer free, or substantially free of enzymes and hydrophilic binder modification and/or hydrophilic-modified polysiloxane oils is believed to improve the resistance towards bio-fouling of said fouling control system compared to a system where the first layer does not contain such a hydrophilic modification. Without being bound to any particular theory, it is believed that the hydrophilic modification of the binder matrix and/or hydrophilic-modified polysiloxane oils will aid the diffusion of the enzymes in the first layer, thus keeping a constant release rate of enzymes due to the diffusion being controlled by the outermost layer.

A fouling control coating system comprising at least a cured first coat and a cured second coat,
  a) said first coat comprising a polysiloxane-based binder matrix constituting at least 40% by dry weight of said first coat, and more than 50% by weight of the binder matrix being represented by polysiloxane parts, said first coat further comprising one or more enzymes;
  b) said binder matrix of said first coat having included as a part thereof hydrophilic oligomer/polymer moieties, and/or said first coat further comprising one or more hydrophilic-modified polysiloxane oils; and
  c) said second coat comprising a polysiloxane-based binder matrix constituting at least 40% by dry weight of said second coat, and more than 50% by weight of the binder matrix being represented by polysiloxane parts.

Within one embodiment of the two above-mentioned variants, it is preferred that the cured first coat comprises one or more hydrophilic-modified polysiloxane oils in an amount of 0.5-20% by dry weight, such as 1-15%, or 2-10%, or 2-7%, by dry weight of the cured first coat.

Within another embodiment of the two above-mentioned variants, it is preferred that the binder matrix of said second coat has included as a part thereof pendant hydrophilic oligomer/polymer moieties, in particular polyoxyalkylene moieties, such as polyoxyethylene moieties. Further, with respect to the amount of pendant hydrophilic oligomer/polymer moieties it is preferred that the polysiloxane-based binder matrix include 5-45%, such as 10-40%, or 15-40%, or even 20-35%, by weight of pendant hydrophilic oligomer/polymer moieties, in particular polyoxyethylene moieties.

Variants of the Third Alternative Aspect of the Invention

Inclusion of enzymes in the first coat, while keeping the outer layer free, or substantially free of enzymes is believed to improve the resistance towards bio-fouling of said fouling control system compared to a system where there is not a first coat containing enzymes. Without being bound to any particular theory, it is believed that the enzymes will slowly diffuse through the outer layer, thus keeping the release of enzymes stable over a longer period.

A fouling control coating system comprising at least a cured first coat and a cured second coat,
a) said first coat comprising a polysiloxane-based binder matrix constituting at least 40% by dry weight of said first coat, and more than 50% by weight of the binder matrix being represented by polysiloxane parts, said first coat further comprising one or more enzymes and optionally one or more hydrophilic-modified polysiloxane oils; and
b) said second coat comprising a polysiloxane-based binder matrix constituting at least 40% by dry weight of said second coat, and more than 50% by weight of the binder matrix being represented by polysiloxane parts.

Within this variant, it is preferred that the cured first coat comprises one or more hydrophilic-modified polysiloxane oils in an amount of 0.5-20% by dry weight, such as 1-15%, or 2-10%, or 2-7%, by dry weight of the cured second coat.

Application of the Coating Composition

The coating composition of the invention is typically applied to at least a part of the surface of a substrate.

The term "applying" is used in its normal meaning within the paint industry. Thus, "applying" is conducted by means of any conventional means, e.g. by brush, by roller, by spraying, by dipping, etc. The commercially most interesting way of "applying" the coating composition is by spraying. Hence, the coating composition is preferably sprayable. Spraying is effected by means of conventional spraying equipment known to the person skilled in the art. The coating is typically applied in a dry film thickness of 50-600 μm, such as 50-500 μm, e.g. 75-400 μm, or 20-150 μm, or 30-100 μm.

Moreover, the coating composition is preferably such with respect to sag resistance cf. ASTM D 4400-99 (i.e. relating to its ability to be applied in a suitable film thickness to a vertical surface without sagging) that it exhibits sag resistance for a wet film thickness up to at least 70 μm, such as up to at least 200 μm, preferably up to at least 400 μm, and in particular up to at least 600 μm.

The term "at least a part of the surface of a substrate" refers to the fact that the coating composition may be applied to any fraction of the surface. For many applications, the coating composition is at least applied to the part of the substrate (e.g. a vessel) where the surface (e.g. the ship's hull) may come in contact with water, e.g. sea-water.

The term "substrate" is intended to mean a solid material onto which the coating composition is applied. The substrate typically comprises a metal such as steel, iron, aluminium, or glass-fibre reinforced polyester. In the most interesting embodiments, the substrate is a metal substrate, in particular a steel substrate. In an alternative embodiment, the substrate is a glass-fibre reinforced polyester substrate. In some embodiments, the substrate is at least a part of the outermost surface of a marine structure.

The term "surface" is used in its normal sense, and refers to the exterior boundary of an object. Particular examples of such surfaces are the surface of marine structures, such as vessels (including but not limited to boats, yachts, motorboats, motor launches, ocean liners, tugboats, tankers, container ships and other cargo ships, submarines, and naval vessels of all types), pipes, shore and off-shore machinery, constructions and objects of all types such as piers, pilings, bridge substructures, water-power installations and structures, underwater oil well structures, nets and other aquatic culture installations, and buoys, etc.

The surface of the substrate may either be the "native" surface (e.g. the steel surface). However, the substrate is typically coated, e.g. with an anticorrosive coating and/or a tie coat, so that the surface of the substrate is constituted by such a coating. When present, the (anticorrosive and/or tie) coating is typically applied in a total dry film thickness of 100-600 μm, such as 150-450 μm, e.g. 200-400 μm. Alternatively, the substrate may carry a paint coat, e.g. a worn-out fouling release paint coat, or similar.

In one important embodiment, the substrate is a metal substrate (e.g. a steel substrate) coated with an anticorrosive coating such as an anticorrosive epoxy-based coating, e.g. cured epoxy-based coating, or a shop-primer, e.g. a zinc-rich shop-primer. In another relevant embodiment, the substrate is a glass-fiber reinforced polyester substrate coated with an epoxy primer coating.

This being said, the invention also relates to a method of establishing a fouling control coating system on a surface of a substrate (either according to the first alternative aspect, the second alternative aspect or the third alternative aspect), comprising the sequential steps of:
a) applying one or more layers of a polysiloxane-based coating composition onto the surface of said substrate, e.g. either a native substrate or a substrate already carrying one or more coatings, as the case may be, and allowing said layer(s) to cure, thereby forming a cured first coat as defined hereinabove for the first alternative aspect, the second alternative aspect or the third alternative aspect, and
b) applying one or more layers of a polysiloxane-based coating composition onto the surface of said cured first coat, and allowing said layer(s) to cure, thereby forming a cured second coat as defined hereinabove for the first alternative aspect, the second alternative aspect or the third alternative aspect, respectively.

The invention also relates to a method of establishing a fouling control coating system on a surface of a substrate (either according to the first alternative aspect, the second alternative aspect or the third alternative aspect), comprising the sequential steps of:

a) applying one or more layers of a primer composition onto the surface of said substrate, and allowing said layer(s) to cure, thereby forming a primed substrate, b) optionally applying one or more layers of a tie-coat composition onto the surface of said primed substrate, and allowing said layer(s) to cure, thereby forming a cured tie-coat;

c) applying one or more layers of a polysiloxane-based coating composition onto the surface of said primed substrate or the surface of said tie-coat, as the case may be, and allowing said layer(s) to cure, thereby forming a cured first coat as defined hereinabove for the first alternative aspect, the second alternative aspect or the third alternative aspect, and d) applying one or more layers of a polysiloxane-based coating composition onto the surface of said cured first coat, and allowing said layer(s) to cure, thereby forming a cured second coat as defined hereinabove for the first alternative aspect, the second alternative aspect or the third alternative aspect, respectively.

The invention further relates to a method of establishing a fouling control coating system on a surface of an aged antifouling coating system (either according to the first alternative aspect, the second alternative aspect or the third alternative aspect), comprising the sequential steps of:

a) applying one or more layers of a sealer/link-coat composition onto the surface of said substrate, allowing said layer(s) to cure, thereby forming a sealed substrate, b) optionally applying one or more layers of a tie-coat composition onto the surface of said sealed substrate, and allowing said layer(s) to cure, thereby forming a cured tie-coat;

c) applying one or more layers of a polysiloxane-based coating composition onto the surface of said primed substrate or the surface of said tie-coat, as the case may be, and allowing said layer(s) to cure, thereby forming a cured first coat as defined hereinabove for the first alternative aspect, the second alternative aspect or the third alternative aspect, and d) applying one or more layers of a polysiloxane-based coating composition onto the surface of said cured first coat, and allowing said layer(s) to cure, thereby forming a cured second coat as defined hereinabove for the first alternative aspect, the second alternative aspect or the third alternative aspect, respectively.

The invention further relates to a method of establishing a fouling control coating system on a surface of an aged fouling release coating system (either according to the first alternative aspect, the second alternative aspect or the third alternative aspect), comprising the sequential steps of:

a) optionally applying one or more layers of a tie-coat composition onto the surface of said aged fouling release coating system, and allowing said layer(s) to cure, thereby forming a cured tie-coat;

b) applying one or more layers of a polysiloxane-based coating composition onto the surface of said primed substrate or the surface of said tie-coat, as the case may be, and allowing said layer(s) to cure, thereby forming a cured first coat as defined hereinabove for the first alternative aspect, the second alternative aspect or the third alternative aspect, and c) applying one or more layers of a polysiloxane-based coating composition onto the surface of said cured first coat, and allowing said layer(s) to cure, thereby forming a cured second coat as defined hereinabove for the first alternative aspect, the second alternative aspect or the third alternative aspect, respectively.

A Marine Structure

The present invention also provides a marine structure comprising on at least a part of the outer surface thereof an outermost fouling control coating system as defined hereinabove. In particular, at least as part of the outer surface carrying the outermost coating is a submerged part of said structure.

The coating composition, the method of establishing the coating on the substrate surface, and the characteristics of the coating follow the directions given hereinabove.

In one embodiment, the fouling control coating system of the marine structure may consist of an anticorrosive layer, a tie-coat and the fouling control coating system as described herein.

In an alternative embodiment, the fouling control coating composition is applied on top of a used fouling control coating system, e.g. on top of a used polysiloxane-based fouling control coat.

In one particular embodiment of the above marine structure, the anticorrosive layer has a total dry film thickness of 100-600 µm, such as 150-450 µm, e.g. 200-400 µm; the tie-coat has a total dry film thickness of 50-500 µm, such as 50-400 µm, e.g. 75-350 µm or 75-300 µm or 75-250 µm; and the first coat of the fouling control coating has a total dry film thickness of 20-500 µm, such as 20-400 µm, e.g. 50-300 µm, and the second coat of the fouling control coating system has a total dry film thickness of 20-500 µm, such as 20-400 µm, e.g. 50-300 µm.

A further embodiment of the marine structure is that where at least a part of the outermost surface of said structure is coated with a fouling control coating system comprising a total dry film thickness of 150-400 µm of an anticorrosive layer of an epoxy-based coating established by application of 1-4, such as 2-4, layers;

a total dry film thickness of 20-400 µm of the tie-coat established by application of 1-2 layers;

a total dry film thickness of 20-400 µm of the first coat of the fouling control coating established by application of 1-2 layers;

a total dry film thickness of 20-400 µm of the second coat of the fouling control coating established by application of 1-2 layers.

In another embodiment of the above marine structure, the fouling control coating is applied directly on the anticorrosive layer without the use of tie-coat.

General Remarks

Although the present description and claims occasionally refer to a polysiloxane, etc., it should be understood that the coating compositions defined herein may comprise one, two or more types of the individual constituents. In such embodiments, the total amount of the respective constituent should correspond to the amount defined above for the individual constituent.

The "(s)" in the expressions: compound(s), polysiloxane(s), agent(s), etc. indicates that one, two or more types of the individual constituents may be present.

On the other hand, when the expression "one" is used, only one (1) of the respective constituent is present.

EXAMPLES

Preparation Method for the Model Paints

Part (i): binder, solvents, pigments, biocides (if needed) and additives are mixed on a Diaf dissolver equipped with an impeller disc (e.g. 70 mm diameter impeller disc in a 1 L can for 15 minutes at 2000 rpm).

Part (ii): ethyl silicate, solvents, catalyst, and 2,4-pentanedione are mixed on a Diaf dissolver equipped with an impeller disc (e.g. 70 mm diameter impeller disc in a 1 L can for 2 minutes at 500 rpm).

Before the application, part (i) and part (ii) are mixed together with the hydrophilic-modified polysiloxane oils and/or the reactive hydrophilic modified polysiloxane binder according to the compositions provided in the examples, and if present, enzymes are added in a solution/suspension in water, whereafter the mix is then stirred to obtain homogeneity.

Test Methods

Viscosity

In the present application with claims, viscosity is measured at 25° C. in accordance with ISO 2555:1989.

Water Contact Angle Measurements

Establishment of the equilibrium water contact angle of the cured surface is done using sessile drop contact angles, measured by a contact goniometer (Dataphyics OCA) with Milli-Q water as test liquid. The substrate is placed in a temperature controlled chamber, and static contact angles measured by dispersing a drop of 20 µl onto the substrate. Water contact angles are established automatically using the Dataphysixs OCA software. The water contact angle is considered stable when two consecutive measurements at least five minutes apart are not considered significantly different from each other. If this does not happen, the water contact angle after 60 minutes is reported.

Raft Test

Preparation of Panels

An acrylic panel (150×200 mm), sandblasted on one side to facilitate adhesion of the coating, is coated with 100 µm (DFT) of a commercial epoxy (HEMPEL Light Primer 45551) applied by air spraying. After 6-24 hrs of drying at room temperature a tie coat is applied by doctor blade of 300 µm clearance. After 16-30 hrs of drying the first layer is applied by doctor blade with a clearance as specified in the examples. After 16-30 hrs of drying the second coat is applied by doctor blade with a clearance so that the wet film thickness of the layer becomes as specified in the corresponding examples. The panels are dried for at least 72 hrs before immersion on the raft.

Testing

Panels are tested at two different locations; Spain and Singapore.

Test site in Spain: Located in Vilanova in north-eastern Spain. At this test site the panels are immersed into sea water with salinity in the range of 37-38 parts per thousand at an average temperature of 17-18° C.

Test site in Singapore: At this test site the panels are immersed into sea water with salinity in the range of 29-31 parts per thousand at a temperature in the range of 29-31° C.

Panels are inspected ever 4-12 weeks and evaluated according to the following scale:

| Level | Description |
| --- | --- |
| Excellent | Only slime |
| Good | Algae + Animals < 10% |
| Fair | 10% < Algae + Animals < 25% |
| Poor | Algae + Animals > 25% |

EXAMPLES

The following model paints can be prepared for testing for antifouling performance. All entries in model paints table are in weight unless otherwise stated. In the calculation of the final polysiloxane matrix, all the hydrolysable groups are presumed completely hydrolysed and reacted into a matrix through a condensation reaction with the polysiloxane binder. Therefore, the ethyl silicate contributes with 41% of its weight to the calculations of the final polysiloxane matrix and vinyltrimethoxysilane contributes with 54% of its weight correspondingly. When calculating the polysiloxane content of the binder matrix, the constituents are included in the calculations as the starting materials, however with the above-mentioned corrections for ethyl silicate and vinyltrimethoxysilane.

Materials

RF-5000, ex. Shin-Etsu—Japan, silanol-terminated polydimethylsiloxane

Xylene from local supplier

Aerosil R972, ex. Evonik industries

Silikat TES 40 WN, ex. Wacker chemie—Germany, ethyl silicate

Neostann U-12, ex. Nitto, Kasai—Japan, Dibutyltin dilaurate

Acetylaceton, ex. Wacker Chemie—Germany, 2, 4-pentanedione

Byk331, ex. Byk—Germany, non-reactive polyether modified polydimethylsiloxane oil Bayferrox 130M, ex. Lancess—Germany, Iron oxide Copper Omadine, ex. Arch Chemicals Inc.—Ireland, Copper Pyrithione DC190, ex. Dow Corning—USA, Polyether modified polysiloxane Tego glide 435, ex. Evonik Industries—Germany, non-reactive polyether modified polydimethylsiloxane oil DC5103, ex. Dow Corning—USA, polyether modified polysiloxane (siloxylated polyether)

DC 550, ex. Dow Corning—USA, polyphenylmethyldimethylsiloxane

DC 57, ex. Dow Corning—USA, polyether modified polydimethyl siloxane.

SIV9280.0, ex. Gelest—USA, Vinyltris(methylethylketoximino)silane.

Fumed silica

Polyamide wax

Sachtleben R320, ex. Sachtleben—Germany, Micronized rutile titanium dioxide.

Zinc omadine, ex. Arch Chemicals Inc.—Ireland, Zinc Pyrithione

Econea, ex. JanssenPMP—Belgium, Tralopyril

Cellulase, (22178) ex. Sigma Aldrich Cellulase from *Aspergillus Niger*

Savinase 16L type EX, ex. Novozymes—Denmark, solution of protease (subtilisin). copolymer KF6015, ex. Shin-Etsu—Japan, polyether-modified silicone fluid.

Dynasylan VTMO, ex. Evonik Industries—Germany, vinyltrimethoxysilane

Platinum-divinyltetramethyldisiloxane complex in xylene—2.1-2.4% platinum concentration, CAS No. 68478-92-2

Polydimethylsiloxane, hydride terminated—$MW_n$=1100, eq. weight=550 g/eq

Methylhydrosiloxane-dimethylsiloxane copolymer, hydride terminated—MWn=2300, eq. weight=200 g/eq
Polyethylene glycol di allyl ether—$MW_n$=300 g/mol, Eq. weight=150 g/eq
Polyethylene glycol mono allyl ether (hydroxyl terminated)—$MW_n$=350 g/mol, eq. weight=350 g/eq
Polyethylene glycol mono allyl ether (hydroxyl terminated)—$MW_n$=500 g/mol, eq. weight=500 g/eq
Branched Hydrophilic Modified Polsiloxane (HMP3):

A branched, curable poly(ethylene glycol) modified polysiloxane is prepared by mixing 25.0 g polydimethylsiloxane-methylhydrosiloxane, hydride terminated dissolved in 50.0 g water free toluene, with 0.14 g platinum-divinyltetramethyldisiloxane complex in xylene solution. The solution is heated to 80° C. To this solution, 4.0 g of vinyltrimethoxysilane is added drop-wise and allowed to react for ½h at 80° C. After the completion of the reaction, 68.5 g polyethylene glycol mono allyl ether [A350] is added drop-wise, and allowed to react for 3 h at 80° C. The content of PEG-modified PDMS binder in HMP3 is 66.1% w/w. The amount of PEG in the HMP3 binder is 70.3% w/w.

Linear hydrophilic modified polysiloxane (HMP4):

A linear, curable poly(ethylene glycol) modified polysiloxane is prepared by mixing 100.0 g of hydride terminated polydimethylsiloxane dissolved in 75.0 g water free toluene, with 0.17 g of platinum-divinyltetramethyldisiloxane complex in xylene solution. The solution is heated to 80° C. under stirring. To this solution 1.7 g polyethylene glycol di allyl ether [AA300] is added drop-wise, and allowed to react for 2 h at 80° C. After the completion of the reaction 5.4 g of vinyltrimethoxysilane is added drop-wise at 80° C. and allowed to react for 1 h at 80° C. The content of PEG-modified PDMS binder in HMP4 is 58.8% w/w. The amount of PEG in the HMP4 binder is 5.0% w/w.

Branched Hydrophilic Modified Polysiloxane (HMP5):

A branched, curable poly(ethylene glycol) modified polysiloxane is prepared by mixing 25.0 g polydimethylsiloxane-methylhydrosiloxane, hydride terminated dissolved in 50.0 g water free toluene, with 0.14 g platinum-divinyltetramethyldisiloxane complex in xylene solution. The solution is heated to 80° C. To this solution, 4.0 g of vinyltrimethoxysilane is added drop-wise and allowed to react for ½h at 80° C. After the completion of the reaction, 90.0 g polyethylene glycol mono allyl ether [A500] is added drop-wise, and allowed to react for 3 h at 80° C. The content of PEG-modified PDMS binder in HMP5 is 64.4% w/w. The amount of PEG in the HMP5 binder is 75.6% w/w.

The reactive hydrophilic modified polysiloxanes (MHP3, MHP4, HMP5) are stored in a closed container under dry nitrogen to avoid contact with moisture prior to the formulation.

Example 1

Base 1

| | | |
|---|---|---|
| Part i | RF-5000 silanol-terminated polysiloxane | 69.1 g |
| | Xylene | 24.6 g |
| | Aerosil | 1.2 g |
| | Polyamide wax | 0.8 g |
| | Bayferrox 130M | 4.3 g |
| sum | | 100.0 g |

Base 2

| | | |
|---|---|---|
| Part i | RF-5000 silanol-terminated polysiloxane | 64.3 g |
| | Xylene | 23.0 g |
| | Aerosil | 1.1 g |
| | Polyamide wax | 0.6 g |
| | Bayferrox 130M | 4.0 g |
| | Copper Omadine | 7.0 g |
| sum | | 100.0 g |

Base 3

| | | |
|---|---|---|
| Part i | RF-5000 silanol-terminated polysiloxane | 60.6 g |
| | Xylene | 21.6 g |
| | Aerosil | 1.0 g |
| | Polyamide wax | 0.6 g |
| | Bayferrox 130M | 3.7 g |
| | Copper Omadine | 12.4 g |
| sum | | 99.9 g |

Base 4

| | | |
|---|---|---|
| Part i | RF-5000 silanol-terminated polysiloxane | 55.1 g |
| | Xylene | 16.1 g |
| | Aerosil | 0.59 g |
| | Sachtleben R320 | 28.5 g |
| sum | | 100.0 g |

Base 5

| | | |
|---|---|---|
| Part i | RF-5000 silanol-terminated polysiloxane | 64.3 g |
| | Xylene | 23.0 g |
| | Aerosil | 1.1 g |
| | Polyamide wax | 0.6 g |
| | Bayferrox 130M | 4.0 g |
| | Zinc Omadine | 7.0 g |
| sum | | 100.0 g |

Base 6

| | | |
|---|---|---|
| Part i | RF-5000 silanol-terminated polysiloxane | 64.3 g |
| | Xylene | 23.0 g |
| | Aerosil | 1.1 g |
| | Polyamide wax | 0.6 g |
| | Bayferrox 130M | 4.0 g |
| | Econea | 7.0 g |
| sum | | 100.0 g |

One-Component Paint 1*

| | | |
|---|---|---|
| Part i | RF-5000 silanol-terminated polysiloxane | 40.8 g |
| | Xylene | 20.2 g |
| | Filler | 14.4 |
| | Polyamide wax | 0.3 g |

-continued

| | | |
|---|---|---|
| Sachtleben R320 (pigment) | 14.2 g | |
| SIV9380.0 | 5.4 | |
| Copper Omadine | 4.8 g | |
| sum | 100.1 g | |

This composition may be used as a one-component composition without the need of a curing agent.

Curing Agent 1

| | | | |
|---|---|---|---|
| Part ii | Silikat TES 40WN | 31.9 g | |
| | Xylene | 46.3 g | |
| | Acetylaceton | 16.4 g | |
| | Neostann U-12 | 5.5 g | |
| | sum | 100.1 g | |

Example 1.A

| | 1st layer | | | 2nd layer | | | | Water contact angle of the 2nd layer Measured after 60 minutes | Antifouling performance Performance in Spain after 8 weeks |
|---|---|---|---|---|---|---|---|---|---|
| | Base | Curing agent | Gap-size/ approx. DFT | Base | Curing agent | Additive | Gap-size/ approx. DFT | | |
| A1 | 92.5 g Base 2 (CuPT$_2$) | 7.5 g C.A. 1 | 400 μm/ 150 μm | 88.5 g Base 1 | 7.7 g C.A. 1 | 3.8 g Byk331 | 400 μm/ 150 μm | 17° | Excellent |
| A2 | 92.5 g Base 2 (CuPT$_2$) | 7.5 g C.A. 1 | 400 μm/ 150 μm | 88.5 g Base 1 | 7.7 g C.A. 1 | 3.8 g Byk331 | 300 μm/ 100 μm | 17° | Excellent |
| A3 | 92.5 g Base 2 (CuPT$_2$) | 7.5 g C.A. 1 | 400 μm/ 150 μm | 88.5 g Base 1 | 7.7 g C.A. 1 | 3.8 g Byk331 | 250 μm/ 50 μm | 17° | Excellent |
| RefA4 | 92 g Base 1 | 8 g C.A. 1 | 400 μm/ 150 μm | 88.5 g Base 1 | 7.7 g C.A. 1 | 3.8 g Byk331 | 400 μm/ 150 μm | 17° | Poor |
| A5 | 92.9 g Base 3 (CuPT$_2$) | 7.1 g C.A. 1 | 400 μm/ 150 μm | 88.5 g Base 1 | 7.7 g C.A. 1 | 3.8 g Byk331 | 300 μm/ 100 μm | 17° | Excellent |
| Ref A6 | 92.9 g Base 3(CuPT$_2$) | 7.1 g C.A. 1 | 400 μm/ 150 μm | 92 g Base 1 | 8.0 g C.A. 1 | | 300 μm/ 100 μm | 83° | Fair |
| Ref A7 | 92 g Base 1 | 8 g C.A. 1 | 400 μm/ 150 μm | 92 g Base 1 | 8.0 g C.A. 1 | | 300 μm/ 100 μm | 83° | Poor |
| Ref A8 | 92.5 g Base 2 (CuPT$_2$) | 7.5 g C.A. 1 | 400 μm/ 150 μm | Intersleek 900 | | | 300 μm/ 100 μm | 65° | Poor |

Example 1.B

| | 1st layer | | | 2nd layer | | | | Water contact angle of the 2nd layer Measured after 60 minutes | Antifouling performance Performance in Spain after 10 weeks |
|---|---|---|---|---|---|---|---|---|---|
| | Base | Curing agent | Measured after 60 minutes | Base | Curing agent | Additive | Gap-size/ approx. DFT | | |
| B1 | 92.5 g Base 2 (CuPT$_2$) | 7.5 g C.A. 1 | 400 μm/ 150 μm | 88.7 g Base 1 | 7.7 g C.A. 1 | 3.6 g Tego Glide 435 | 300 μm/ 100 μm | <10° | Good |
| B2 | 92 g Base 1 | 8 g C.A. 1 | 400 μm/ 150 μm | 88.7 g Base 1 | 7.7 g C.A. 1 | 3.6 g Tego Glide 435 | 300 μm/ 100 μm | <10° | Poor |
| B3 | 92.5 g Base 2 (CuPT$_2$) | 7.5 g C.A. 1 | 400 μm/ 150 μm | 88.5 g Base 1 | 7.7 g C.A. 1 | 3.8 g DC5103 | 300 μm/ 100 μm | <10° | Fair |
| RefB4 | 92 g Base 1 | 8 g C.A. 1 | 400 μm/ 150 μm | 88.5 g Base 1 | 7.7 g C.A. 1 | 3.8 g DC5103 | 300 μm/ 100 μm | <10° | Poor |
| Ref B5 | 92.5 g Base 2 (CuPT$_2$) | 7.5 g C.A. 1 | 400 μm/ 150 μm | Intersleek 900 | | | 300 μm/ 100 μm | 65° | Poor |

Example 1.C

| | 1st layer | | | | 2nd layer | | | Water contact angle of the 2nd layer Measured after 60 minutes | Antifouling performance after 54 weeks in Spain |
|---|---|---|---|---|---|---|---|---|---|
| | Base | Curing agent | Additive | Gap-size/ approx. DFT | Base | Curing agent | Gap-size/ approx. DFT | | |
| C1 | 87.9 g Base 2 (CuPT$_2$) | 7.1 g C.A. 1 | 5 g Byk331 | 400 μm/ 150 μm | 7.5 g Base 1 | 7.6 g C.A. 1 | 3.5 g DC550 2 g DC57 | 400 μm/ 150 μm | 15° | Good |

-continued

|   | 1st layer | | | | 2nd layer | | | | Water contact angle of the 2nd layer Measured after 60 minutes | Antifouling performance after 54 weeks in Spain |
|---|---|---|---|---|---|---|---|---|---|---|
|   | Base | Curing agent | Additive | Gap-size/ approx. DFT | Base | Curing agent | | Additive | | |
| Ref C2 | 7.5 g Base 1 | 7.6 g C.A. 1 | 3.5 g DC550 2 g DC57 | 400 μm/ 150 μm | 7.5 g Base 1 | 7.6 g C.A. 1 | | 3.5 g DC550 2 g DC57 | 400 μm/ 150 μm | 15° | Poor |

Example 1.D

|   | 1st layer | | | | 2nd layer | | | | | Water contact angle of the 2nd layer Measured after 60 minutes | Antifouling performance after 49 weeks in Spain |
|---|---|---|---|---|---|---|---|---|---|---|---|
|   | Base | Curing agent | Additive | Gap-size/ approx. DFT | Base | Curing agent | Additive | Biocide | Gap-size/ approx. DFT | | |
| D1 | | One-component paint 1 100 g (ZnPT$_2$) | | 400 μm/ 150 μm | 87.9 g Base 4 | 7.1 g C.A 1 | | 5 g Tego 435 | 400 μm/ 150 μm | <10° | Fair |
| Ref D2 | 7.5 g Base 1 | 7.6 g C.A. 1 | 3.5 g DC550 2 g DC57 | 400 μm/ 150 μm | | | | | | 15° | Poor |

Example 1.E

|   | 1st layer | | | | 2nd layer | | | | Water contact angle of the 2nd layer Measured after 60 minutes | Antifouling performance Performance in Spain after 10 weeks |
|---|---|---|---|---|---|---|---|---|---|---|
|   | Base | Curing agent | Additive | Gap-size/ approx. DFT | Base | Curing agent | Additive | Gap-size/ approx. DFT | | |
| E1 | 92.5 g Base 6 (Econea) | 7.5 g C.A. 1 | | 400 μm/ 150 μm | 88.5 g Base 1 | 7.7 g C.A. 1 | 3.8 g Byk331 | 300 μm/ 100 μm | 17° | Excellent |
| E2 | 92.5 g Base 6 (Econea) | 7.5 g C.A. 1 | | 400 μm/ 150 μm | 88.5 g Base 1 | 7.7 g C.A. 1 | 3.8 g Tego glide 435 | 300 μm/ 100 μm | <10° | Excellent |
| E3 | 88.9 g Base 6 (Econea) | 7.4 g C.A. 1 | 3.7 g Tego glide 435 | 400 μm/ 150 μm | 88.5 g Base 1 | 7.7 g C.A. 1 | 3.8 g Tego glide 435 | 300 μm/ 100 μm | <10° | Excellent |
| E4 | 88.9 g Base 6 (Econea) | 7.4 g C.A. 1 | 3.7 g Tego glide 435 | 400 μm/ 150 μm | 70.8 g Base 1 8.5 g Base 6 | 7.7 g C.A. 1 | 3.8 g Tego glide 435 | 300 μm/ 100 μm | <10° | Excellent |
| E5 | 92.5 g Base 5 (ZnPT$_2$) | 7.5 g C.A. 1 | | 400 μm/ 150 μm | 88.5 g Base 1 | 7.7 g C.A. 1 | 3.8 g Tego glide 435 | 300 μm/ 100 μm | <10° | Excellent |
| E6 | 46.3 g Base 5 (ZnPT$_2$) 46.2 g Base 6 (Econea) | 7.5 g C.A. 1 | | 400 μm/ 150 μm | 88.5 g Base 1 | 7.7 g C.A. 1 | 3.8 g Tego glide 435 | 300 μm/ 100 μm | <10° | Good |
| Ref E7 | 88.5 g Base 1 | 7.7 g C.A. 1 | 3.8 g Byk331 | 300 μm/ 100 μm | | | | | 17° | Poor |
| Ref E8 | 88.5 g Base 1 | 7.7 g C.A. 1 | 3.8 g Tego glide 435 | 300 μm/ 100 μm | | | | | <10° | Fair |
| Ref E9 | 92.5 g Base 5 (ZnPT$_2$) | 7.5 g C.A. 1 | | 400 μm/ 150 μm | Intersleek 900 | | | 300 μm/ 100 μm | 65° | Poor |

Example 1.F

| | 1st layer | | | | 2nd layer | | | | Antifouling performance | |
|---|---|---|---|---|---|---|---|---|---|---|
| | Base | Curing agent | | Gap-size/ approx. DFT | Base | Curing agent | Modified binder | Gap-size/ approx. DFT | Weight % of PEG in outer layer (solids) | Performance in Spain after 10 weeks |
| F1 | 92.5 g Base 5 (ZnPT₂) | 7.5 g C.A. 1 | | 400 μm/ 150 μm | 66.8 g Base 1 | 5.8 g C.A. 1 | 27.4 g HMP3 | 300 μm/ 100 μm | 18.3 | Fair |
| F1 | 88.9 g Base 6 (econea) | 7.4 g C.A. 1 | 3.7 g Tego glide 435 | 400 μm/ 150 μm | 66.8 g Base 1 | 5.8 g C.A. 1 | 27.4 g HMP3 | 300 μm/ 100 μm | 18.3 | N/A |
| Ref F3 | 66.8 g Base 1 | 5.8 g C.A. 1 | 27.4 g HMP3 | 300 μm/ 100 μm | | | | | 18.3 | Poor |
| F4 | 92.5 g Base 5 (ZnPT₂) | 7.5 g C.A. 1 | | 400 μm/ 150 μm | 66.3 g Base 1 | 5.8 g C.A. 1 | 28.0 g HMP5 | 300 μm/ 100 μm | 19.7 | Excellent |
| Ref F5 | 66.3 g Base 1 | 5.8 g C.A. 1 | 28.0 g HMP5 | 300 μm/ 100 μm | | | | | 19.7 | Poor |
| F6 | 92.5 g Base 5 (ZnPT₂) | 7.5 g C.A. 1 | | 400 μm/ 150 μm | 64.6 g Base 1 | 5.6 g C.A. 1 | 29.8 g HMP4 | 300 μm/ 100 μm | 1.3 | Poor |
| Ref F7 | 64.6 g Base 1 | 5.6 g C.A. 1 | 29.8 g HMP4 | 300 μm/ 100 μm | | | | | 1.3 | poor |
| Ref F8 | 92.5 g Base 5 (ZnPT₂) | 7.5 g C.A. 1 | | 400 μm/ 150 μm | Intersleek 900 | | | 300 μm/ 100 μm | | Poor |

Example 1.G

| | 1st layer | | | | 2nd layer | | | | Water contact angle of the 2nd layer Measured after 60 minutes | Weight % of PEG in outer layer (solids) | Antifouling performance Antifouling performance after 10 weeks in Spain |
|---|---|---|---|---|---|---|---|---|---|---|---|
| | Base | Curing agent | Enzyme | Gap-size/ approx. DFT | Base | Curing agent | | Gap-size/ approx. DFT | | | |
| G1 | 89.2 g Base 1 | 7.8 g C.A.1 | 3 g Savinase | 400 μm/ 150 μm | 88.5 g Base 1 | 7.7 g C.A. 1 | 3.8 g Tego glide 435 | 300 μm/ 100 μm | <10° | | Fair |
| G2 | 83.7 g Base 1 | 7.3 g C.A.1 | 9 g Savinase | 200 μm/ 50 μm | 88.5 g Base 1 | 7.7 g C.A. 1 | 3.8 g Tego glide 435 | 300 μm/ 100 μm | <10° | | Fair |
| G3 | 85.8 g Base 1 | 7.5 g C.A. 1 | 3 g savinase 3.7 g Tego glide 435 | 400 μm/ 150 μm | 88.5 g Base 1 | 7.7 g C.A. 1 | 3.8 g Tego glide 435 | 300 μm/ 100 μm | <10° | | Excellent |
| Ref G4 | 88.5 g Base 1 | 7.7 g C.A. 1 | 3.8 g Tego glide 435 | 400 μm/ 150 μm | | | | | <10° | | Fair |
| G5 | 89.2 g Base 1 | 7.8 g C.A.1 | 3 g Savinase | 400 μm/ 150 μm | 92.0 g Base 1 | 8.0 g C.A. 1 | | 300 μm/ 100 μm | 83° | | Poor |
| G6 | 85.8 Base 1 | 7.5 C.A.1 | 3 g savinase 3.7 g Tego glide 435 | 400 μm/ 150 μm | 92.0 g Base 1 | 8.0 g C.A. 1 | | 300 μm/ 100 μm | 83° | | Excellent |
| Ref G7 | 92.0 g Base 1 | 8.0 g C.A. 1 | | 300 μm/ 100 μm | | | | | 83° | | Poor |
| G8 | 89.2 g Base 1 | 7.8 g C.A.1 | 3 g Endolase | 400 μm/ 150 μm | 88.5 g Base 1 | 7.7 g C.A. 1 | 3.8 g Tego glide 435 | 300 μm/ 100 μm | <10° | | Fair |
| G9 | 89.2 g Base 1 | 7.8 g C.A.1 | 3 g Savinase | 400 μm/ 150 μm | 66.8 g Base 1 | 5.8 g C.A. 1 | 27.4 g HMP3 | 300 μm/ 100 μm | | 18.3 | Fair |
| Ref G10 | 66.8 g Base 1 | 5.8 g C.A. 1 | 27.4 g HMP3 | 300 μm/ 100 μm | | | | | | 18.3 | Poor |
| G11 | 89.2 g Base 1 | 7.8 g C.A.1 | 3 g Savinase | 400 μm/ 150 μm | 64.6 g Base 1 | 5.6 g C.A. 1 | 29.8 g HMP4 | 300 μm/ 100 μm | | 1.3 | Poor |

-continued

| | 1st layer | | | | 2nd layer | | | Water contact angle of the 2nd layer Measured after 60 minutes | Weight % of PEG in outer layer (solids) | Antifouling performance Antifouling performance after 10 weeks in Spain |
|---|---|---|---|---|---|---|---|---|---|---|
| | Base | Curing agent | Enzyme | Gap-size/ approx. DFT | Base | Curing agent | Gap-size/ approx. DFT | | | |
| Ref G12 | 64.6 g Base 1 | 5.6 g C.A. 1 | 29.8 g HMP4 | 300 μm/ 100 μm | | | | | 1.3 | Poor |
| G13 | 86.5 g Base 1 | 7.5 g C.A. 1 | 3 g Savinase 3 g endolase | 400 μm/ 150 μm | 88.5 g Base 1 | 7.7 g C.A. 1 | 3.8 g Tego glide 435 | 300 μm/ 100 μm | <10° | Fair |
| Ref G14 | 89.2 g Base 1 | 7.8 g C.A.1 | 3 g Savinase | 400 μm/ 150 μm | Intersleek 900 | | | 300 μm/ 100 μm | 65° | Poor |

Example 1.H

| | 1st layer | | | | 2nd layer | | | Water contact angle of the 2nd layer Measured after 60 minutes | Antifouling performance |
|---|---|---|---|---|---|---|---|---|---|
| | Base | Curing agent | Enzyme | Gap-size/ approx. DFT | Base | Curing agent | Gap-size/ approx. DFT | | |
| H1 | 88.9 g Base 5 (ZnPT$_2$) | 7.4 g C.A. 1 | 3.7 g Tego glide 435 | 400 μm/ 150 μm | 92.0 g Base 1 | 8.0 g C.A. 1 | | 300 μm/ 100 μm | Excellent |
| H2 | 88.9 g Base 5 (ZnPT$_2$) | 7.4 g C.A. 1 | 3.7 g Tego glide 435 | 400 μm/ 150 μm | 92.0 g Base 1 | 8.0 g C.A. 1 | | 200 μm/ 50 μm | Excellent |
| H3 | 88.9 g Base 5 (ZnPT$_2$) | 7.4 g C.A. 1 | 3.7 g Byk 331 | 400 μm/ 150 μm | 92.0 g Base 1 | 8.0 g C.A. 1 | | 300 μm/ 100 μm | Good |
| Ref H4 | 92.0 g Base 1 | 8.0 g C.A. 1 | | 300 μm/ 100 μm | | | | | Poor |
| H5 | 66.8 g Base 5 (ZnPT$_2$) | 5.8 g C.A. 1 | 27.4 g HMP3 | 400 μm/ 150 μm | 92.0 g Base 1 | 8.0 g C.A. 1 | | 300 μm/ 100 μm | Fair |
| H6 | 66.8 g Base 1 | 5.8 g C.A. 1 | 27.4 g HMP3 3 g Savinase | 400 μm/ 150 μm | 92.0 g Base 1 | 8.0 g C.A. 1 | | 300 μm/ 100 μm | Fair |
| H7 | 85.8 Base 1 | 7.5 C.A. 1 | 3 g savinase 3.7 g Tego glide 435 | 400 μm/ 150 μm | 92.0 g Base 1 | 8.0 g C.A. 1 | | 300 μm/ 100 μm | Good |
| Ref H8 | 92.5 g Base 5 (ZnPT$_2$) | 7.5 g C.A. 1 | | 400 μm/ 150 μm | Intersleek 900 | | | 300 μm/ 100 μm | 65° Poor |
| AX1 | 89.2 g Base 1 | 7.8 g C.A.1 | 3 g Savinase | 400 μm/ 150 μm | Intersleek 900 | | | 300 μm/ 100 μm | 65° Good |
| Ref AX2 | 92.0 g Base 1 | 8.0 g C.A. 1 | | | Intersleek 900 | | | 300 μm/ 100 μm | 65° Poor |

The invention claimed is:

1. A fouling control coating system comprising:
a substrate having a surface;
a cured first coat, the cured first coat comprising one or more layers of a first polysiloxane-based binder matrix and one or more biocides being pyrithione complexes present in an amount of 1 to 20% by dry weight, wherein the first polysiloxane-based binder matrix constitutes at least 40% by dry weight of the cured first coat, and wherein 50 to 90% by weight of the first polysiloxane-based binder matrix is represented by polysiloxane parts; and
a cured second coat on top of the cured first coat such that the cured first coat is between the cured second coat and the substrate the cured second coat comprising one or more layers of a second polysiloxane-based binder matrix, wherein the second polysiloxane-based binder matrix constitutes at least 40% by dry weight of the cured second coat, and wherein more than 50% by weight of the second polysiloxane-based binder matrix is represented by polysiloxane parts;
wherein,
the cured first coat further comprises 0.01 to 20% by dry weight of one or more polysiloxane oils modified with hydrophilic groups being poly(ethylene glycol) groups, wherein said one or more polysiloxane oils modified with hydrophilic groups do not react with any of the first polysiloxane-based binder matrix or the second polysiloxane-based binder matrix, and the second cured coat is free of hydrophilic-modified polysiloxane oils.

2. The fouling control coating system according to claim 1, wherein the cured second coat does not contain biocide.

3. The fouling control coating system according to claim 1, wherein the first polysiloxane-based binder matrix is a polydimethylsiloxane-based binder matrix.

4. The fouling control coating system according to claim 1, wherein the second polysiloxane-based binder matrix is a polydimethylsiloxane-based binder matrix.

5. The fouling control coating system according to claim 1, wherein:
   the first polysiloxane-based binder matrix is a polydimethylsiloxane-based binder matrix, the first polysiloxane-based binder matrix constitutes 50-90% by dry weight of the cured first coat, and the one or more biocides constitute 2-20% by dry weight of said cured first coat;
   the second polysiloxane-based binder matrix is a polydimethylsiloxane-based binder matrix, the second polysiloxane-based binder matrix constitutes 50-90% by dry weight of the cured second coat, and the cured second coat contains biocide; and
   the one or more polysiloxane oils modified with hydrophilic groups are polydimethylsiloxane oils modified with hydrophilic groups being poly(ethylene glycol) groups.

6. The fouling control coating system according to claim 1, wherein the polysiloxane oils modified with hydrophilic groups are present in the first cured coat in an amount of 1 to 10% by dry weight.

7. A method of establishing the fouling control coating system according to claim 1 on the surface of the substrate, comprising the sequential steps of:
   a) applying one or more first layers of a first polysiloxane-based coating composition onto the surface of the substrate and allowing the first layer(s) to cure, thereby forming the cured first coat; and
   b) applying one or more second layers of a second polysiloxane-based coating composition onto said cured first coat, and allowing the second layer(s) to cure, thereby forming the cured second coat.

8. The method of claim 7, wherein the surface is at least a part of the outermost surface of a marine structure.

* * * * *